(12) United States Patent
Okugi et al.

(10) Patent No.: US 8,259,998 B2
(45) Date of Patent: Sep. 4, 2012

(54) IMAGE PROCESSING DEVICE FOR VEHICLE

(75) Inventors: Tomokazu Okugi, Kanagawa (JP); Masaki Chiba, Kanagawa (JP)

(73) Assignee: Mazda Motor Corporation (JP)

( * ) Notice: Subject to any disclaimer, the term of this patent is extended or adjusted under 35 U.S.C. 154(b) by 657 days.

(21) Appl. No.: 12/502,790

(22) Filed: Jul. 14, 2009

(65) Prior Publication Data

US 2010/0080419 A1    Apr. 1, 2010

(30) Foreign Application Priority Data

Sep. 30, 2008  (JP) ................................. 2008-254383
Sep. 30, 2008  (JP) ................................. 2008-254385

(51) Int. Cl.
*G06K 9/00* (2006.01)
(52) U.S. Cl. ...................................... 382/103; 382/104
(58) Field of Classification Search .................. 382/100, 382/104, 205, 209, 215, 216, 218, 248, 276, 382/277, 282, 302–304
See application file for complete search history.

(56) References Cited

U.S. PATENT DOCUMENTS

| | | | |
|---|---|---|---|
| 6,307,914 B1 * | 10/2001 | Kunieda et al. | 378/65 |
| 6,411,328 B1 * | 6/2002 | Franke et al. | 348/149 |
| 6,574,353 B1 * | 6/2003 | Schoepflin et al. | 382/103 |
| 7,860,273 B2 * | 12/2010 | Kochi et al. | 382/103 |
| 7,860,276 B2 * | 12/2010 | Anai et al. | 382/107 |
| 8,050,460 B2 * | 11/2011 | Mueller-Schneiders et al. | 382/104 |
| 8,131,018 B2 * | 3/2012 | Wilson | 382/104 |
| 2004/0175057 A1 * | 9/2004 | Tsao et al. | 382/294 |
| 2005/0002558 A1 * | 1/2005 | Franke et al. | 382/154 |
| 2006/0140447 A1 * | 6/2006 | Park et al. | 382/104 |
| 2008/0002891 A1 | 1/2008 | Shibata | |
| 2009/0067675 A1 * | 3/2009 | Tan et al. | 382/104 |

FOREIGN PATENT DOCUMENTS

| | | |
|---|---|---|
| EP | 1 930 863 A | 6/2008 |
| JP | H07-262375 A | 10/1995 |
| JP | H09-198503 A | 7/1997 |
| JP | 2004-198211 A | 7/2004 |

(Continued)

OTHER PUBLICATIONS

Xi et al., "A fast block-matching algorithm based on adaptive search area and its VLSI architecture for H.264/AVC," Signal Processing: Image Communication 21, 2006, pp. 626-646.*

(Continued)

*Primary Examiner* — Andrew W Johns
*Assistant Examiner* — Shefali Goradia
(74) *Attorney, Agent, or Firm* — Studebaker & Brackett PC; Donald R. Studebaker

(57) ABSTRACT

An image processing device comprising a camera to pick up frame images at the times, a basic template creating portion to create a basic template of a picked-up object in the first image, an image transformation parameter calculating portion to calculate a transformation matrix to execute an image transformation of an object of the first image to an object of the second image, a template transforming portion to create a transformation template by transforming the basic template with the transformation matrix, and a template matching processing portion to execute a template matching processing to the second image with the transformation template to detect the object and to determine that the picked-up object in the second image is identical to the basic template when a matching degree by the matching means is higher than a specified degree.

11 Claims, 20 Drawing Sheets

FOREIGN PATENT DOCUMENTS

| JP | 2007-004256 A | 1/2007 |
|---|---|---|
| JP | 2007-257301 A | 10/2007 |
| JP | 2008-059319 A | 3/2008 |

OTHER PUBLICATIONS

Carlo Tomasi et al. "Detection and Tracking of Point Features"; Technical Report CMU-CS-91-132 published in Apr. 1991; XP002561179.

Michael E. Welser et al. "Projection model snakes for tracking using a Monte Carlo approach"; Journal of Electronic Imaging vol. 13, No. 2, pp. 384-398, published in Apr. 2004; XP001196026.

Jen-Chao Tai et al. "Real-time image tracking for automatic traffic monitoring and enforcement applications"; Image and Vision Computing, vol. 22 (2004), No. 6, pp. 485-501, XP002561180.

P. Tissainayagam et al., "Contour tracking with automatic motion model switching"; Pattern Recognition vol. 36 (2003), No. 10, pp. 2411-2427; published on Oct. 1, 2003 by Elsevier, GB; XP004439132.

Jose Bins et al., "An Intelligent and Task-independent Controller for Video Sequence Analysis"; Proceedings of the Seventh International Workshop in Computer Architecture for Machine Perception (Camp 2005), Published on Jul. 4, 2005, pp. 172-177; XP010835501.

B. Georis et al., "Real-time control of video surveillance systems with program supervision techniques"; Machine Vision and Application vol. 18, No. 3-4, pp. 189-205; published online on Jan. 24, 2007 by Springer, Berlin, DE; XP019510953.

F. Thomanek et al., "Multiple Object Recognition and Scene Interpretation for Autonomous Road Vehicle Guidance"; published on Oct. 24, 1994, pp. 231-236, XP010258341.

Ulrich Newmann et al. "Natural Feature Tracking for Augmented Reality"; IEEE Transaction on Multimedia vol. 1 No. 1, pp. 53-64; published on Mar. 1, 1999 by IEEE service center, NJ, US; XP11036279.

Wen Wu et al. "Detection of Text on Road Signs From Video"; IEEE Transactions on Intelligent Transportation Systems vol. 6, No. 4, pp. 378-390; published in Dec. 2005; XP002561181.

Partial European Search Report dated Jan. 13, 2010; Application No. 09011217.8-1224.

Y. Kanazawa et al.; "Image Mosaicing by Stratified Matching"; Department of Knowledge-based Information Engineering, Toyohashi University of Technology; vol. J86-D-II, No. 6; pp. 816-824.

Kanazawa et al.; "Image Mosaicing by Stratified Matching"; Department of Knowledge-based Information Engineering, Toyohashi University of Technology; Image and Vision Computing 22 (2004) 93-103; www.elsevier.com/locate/imavis.

\* cited by examiner

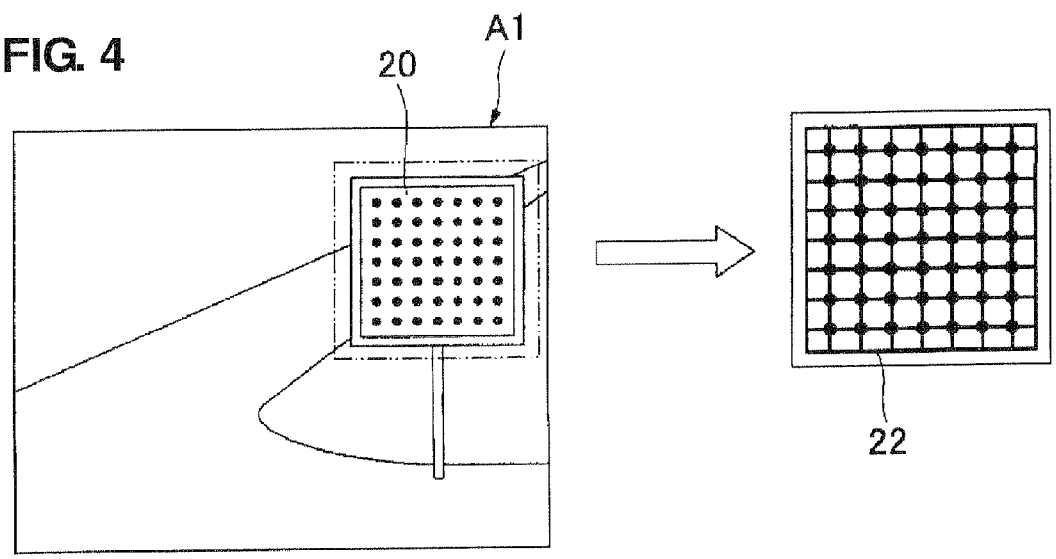

PRIOR ART

Basic Template

Reduced Template

Expanded Template

Rotated Template

Transformation
Template
of Rotation and
Length/Breadth Ratio

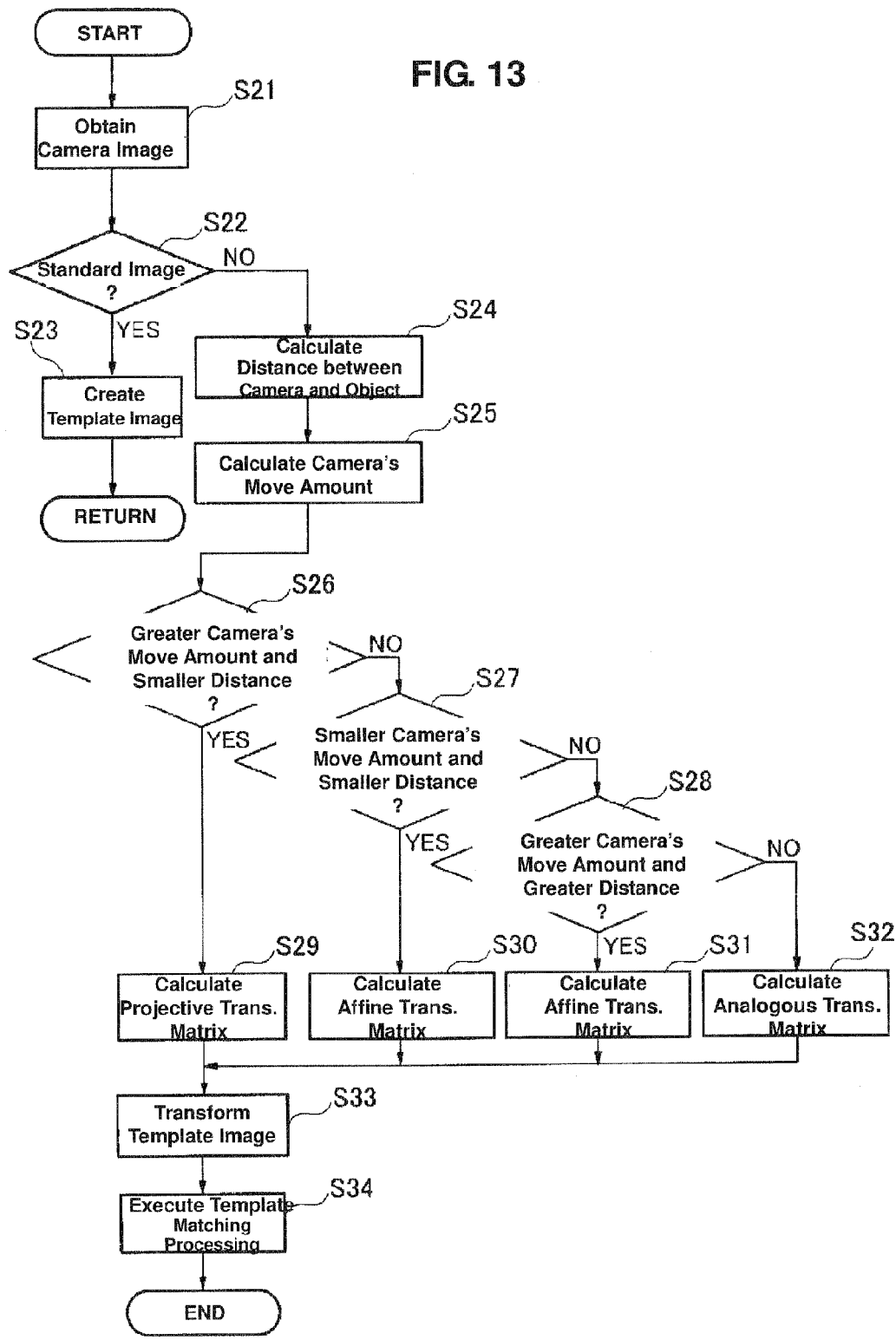

IMAGE PROCESSING DEVICE FOR VEHICLE

BACKGROUND OF THE INVENTION

The present invention relates to an image processing device for a vehicle, and in particular, relates to an image processing device for a vehicle which recognizes an object in an image by an image recognition processing with a template.

Conventionally, technologies of an image recognition of any object (road signs and the like) in a picked-up image picked by using a template image which has been prepared previously are known (see the following publications, for example). According to the device disclosed in U.S. Patent Application Publication No. 2008/0000289 A1, a so-called template matching processing is executed for the image data of road signs picked up with the template image of the road signs. Herein, the pattern matching is conducted by rotating the template image continuously by a specified angle. In the device of the above-described publication, it is determined that the matching is complete when the matching degree has exceeded a specified level, thereby recognizing the road signs in the image data. According to the device disclosed in Japanese Patent Laid-Open Publication No. 2007-257301, meanwhile, the template matching processing is executed so that the size of the template image can be corrected through extension/reduction, considering the distance to the matching object. Herein, the pattern matching is conducted with this corrected template image. Further, according to the device disclosed in Japanese Patent Laid-Open Publication No. 2008-59319, the template matching processing is executed so that the best template image can be determined by relationships between the matching object and the image features (image coordinates, brightness information, etc.). Moreover, the technical paper (Yasushi Kanazawa et al. "Image Mosaicing by Stratified Matching", Technical Report D-II of the Institute of Electronics, Information and Communication Engineers, Vol. J86-D-II, No. 6 (2003), pp. 816-824) discloses the method in which the template is transformed by stages in order of translation, analogous transformation, affine transformation, and projective transformation, and then the best transformation is selected by the evaluation index (geometrical AIC), thereby being properly suitable to the rotation, scale change, and projective transformation.

However, the devices disclosed in the above-described first and second publications have some problem in that even though the template image was changed with the rotation or expansion/reduction, this changed template image could not be matched precisely to the object image in case the view of the object image was distorted in the frame image due to positional relationships between the image picking-up means and the object. Thus, the object could not be recognized properly by these devices. In order to solve the above-described problem, it may be considered properly that plural template images which can provide various view angles for each object are prepared and thereby the matching processing is conducted for each of template images. In this case, however, there is another problem in that the processing would be inefficient and the calculation load would be too high. Further, in case the matching processing is executed with relationships of the image features like the device of the above-described third publication, there is further another problem in that the precise matching could not be obtained for the object image with the above-described distorted view. Also, it could be difficult to precisely recognize objects which are different from each other in the kind but have analogous views. Moreover, the method of the above-described last publication has some problem in that since the image transformation is conducted by stages and the selection of the best transformation is conducted by the evaluation index (geometrical AIC), the processing would be inefficient and the calculation load would be too high.

SUMMARY OF THE INVENTION

The present invention has been devised in view of the above-described problems, and an object of the present invention is to provide an image processing device for a vehicle which can recognize the object efficiently and precisely.

According to the present invention, there is provided an image processing device for a vehicle, comprising an image picking-up means for picking up an image including an object around the vehicle, the image including a first image and a second image, the timing of the second image picked up being a specified time later than that of the first image picked up, a basic template creating means for creating a basic template of the picked-up object in the first image, a transformation matrix calculating means for calculating a transformation matrix to execute an image transformation of an object of the first image to an object of the second image, a transformation template creating means for creating a transformation template by transforming the basic template with the transformation matrix, a matching means for executing a template matching processing to the second image with the transformation template to detect the object, and a determining means for determining that the picked-up object in the second image is identical to the basic template when a matching degree by the matching means is higher than a specified degree.

According to the present invention, the transformation template is created by transforming the basic template created from the first image with the transformation matrix, and the template matching processing is executed for the second image. Thereby, it may not necessary to prepare plural templates for each object.

According to an embodiment of the present invention, the image processing device for a vehicle further comprising a move-amount calculating means for calculating a move amount of the image picking-up means relative to the object, and a distance calculating means for calculating a distance between the object and the image picking-up means, wherein the transformation matrix calculating means calculates the transformation matrix in a manner of an analogous transformation matrix, affine transformation matrix, or projective transformation matrix in accordance with the move amount which is calculated by the move-amount calculating means and the distance which is calculated by the distance calculating means at the time the second image is picked up. Thereby, the calculation load of the transformation matrix calculating processing can be made properly low, and the transformation template can be created with the proper transformation matrix, thereby detect the object precisely.

According to another embodiment of the present invention, the transformation matrix calculating means calculates the transformation matrix in a manner of the projective transformation matrix when the move amount is greater than a specified amount and the distance is a specified distance or smaller. Thereby, the transformation template which is suitable to the precise matching for the object image can be obtained. This is because in general the view of the object image is distorted in a fan shape in case the camera's move amount is great and the object is located near. Accordingly, selecting the projective transformation matrix may be the best in this case.

According to another embodiment of the present invention, the transformation matrix calculating means calculates the transformation matrix in a manner of the affine transformation matrix when the move amount is the specified amount or smaller and the distance is the specified distance or smaller, or when the move amount is greater than the specified amount and the distance is greater than the specified distance. Thereby, the transformation template which is suitable to the precise matching for the object image can be obtained. This is because in general the view of the object image is distorted in a shearing shape in case the object is located far and the camera's move amount is great, or the object is located near and the camera's move amount is small. Accordingly, selecting the affine transformation matrix may be the best in this case.

According to another embodiment of the present invention, the transformation matrix calculating means calculates the transformation matrix in a manner of the analogous transformation matrix when the move amount is the specified amount or smaller and the distance is greater than the specified distance. Thereby, the transformation template which is suitable to the precise matching for the object image can be obtained. This is because in general the view of the object image is distorted in an analogous shape in case the object is located far and the camera's move amount is small. Accordingly, selecting the analogous transformation matrix may be the best in this case.

According to another embodiment of the present invention, the image processing device for a vehicle further comprising a move-amount estimating means for estimating the move amount of the image picking-up, and a three-dimension coordinates-value calculating means for calculating a three-dimension coordinates value of vehicle surroundings by using the first and second images picked up, wherein the move-amount calculating means calculates the move amount of the image picking-up means relative to the object by using a feature in the first image, which is extracted from the first image, and a corresponding point in the second image which corresponds to the feature in the first image, which is extracted from the second image, and the extraction of the corresponding point is executed in such a manner that a predicted position of the corresponding point in the second image which is calculated based on the move amount estimated by the move-amount estimating means, a search area in the second image for extracting the corresponding point is determined having a center of the search area which is located at the predicted position calculated, and the corresponding point is extracted from the search area determined Thereby, since the search area for extracting the corresponding point is determined based on the move amount estimated by the move-amount estimating means, the calculation load can be reduced by the determination of the search area in the matching processing. Further, since the search area is restricted, the mismatching can be prevented, thereby providing the accurate calculation of the move amount.

According to another embodiment of the present invention, the image processing device for a vehicle further comprising a feature-point selecting means for selecting specified numbers of feature points of the feature, wherein the move-amount calculating means calculates the move amount of the image picking-up means relative to the object by using the specified numbers of feature points of the future and corresponding points which correspond to the feature points, and the feature-point selecting means selects the feature points in such a manner that the numbers of epipolar lines which are determined by the selected feature points have a large angle therebetween. Thereby, the feature points can be distributed easily in a range which expands in a perspective direction or the like in the three-dimension space. Accordingly, the accuracy of the calculation of the move amount of the image picking-up means by the move-amount calculating means can be improved.

Herein, the feature-point selecting means may select the feature points in order of a further distance from an image center, the feature points such that an area which is formed by connecting the feature points has the largest area in an image plane, or the feature points by selecting the feature points one by one from areas which are obtained by being split from an image plane into the specified numbers of the feature points. Further, the feature-point selecting means may select the feature points by selecting feature points which form relatively-large optical flow vectors, which are formed by the feature points and corresponding points and have half the specified numbers of feature points, and other feature points which form other relatively-small optical flow vectors, which are formed by the feature points and corresponding points and have half the specified numbers of feature points.

Other features, aspects, and advantages of the present invention will become apparent from the following description which refers to the accompanying drawings.

BRIEF DESCRIPTION OF THE DRAWINGS

FIG. 4 is an explanatory diagram of a basic template according to the present embodiment.

FIG. 13 is a flowchart of processing which is executed by the image processing device for a vehicle according to the present embodiment.

DETAILED DESCRIPTION OF THE INVENTION

Hereinafter, preferred embodiments of the present invention will be described referring to the accompanying drawings.

Embodiment 1

Figure 1:
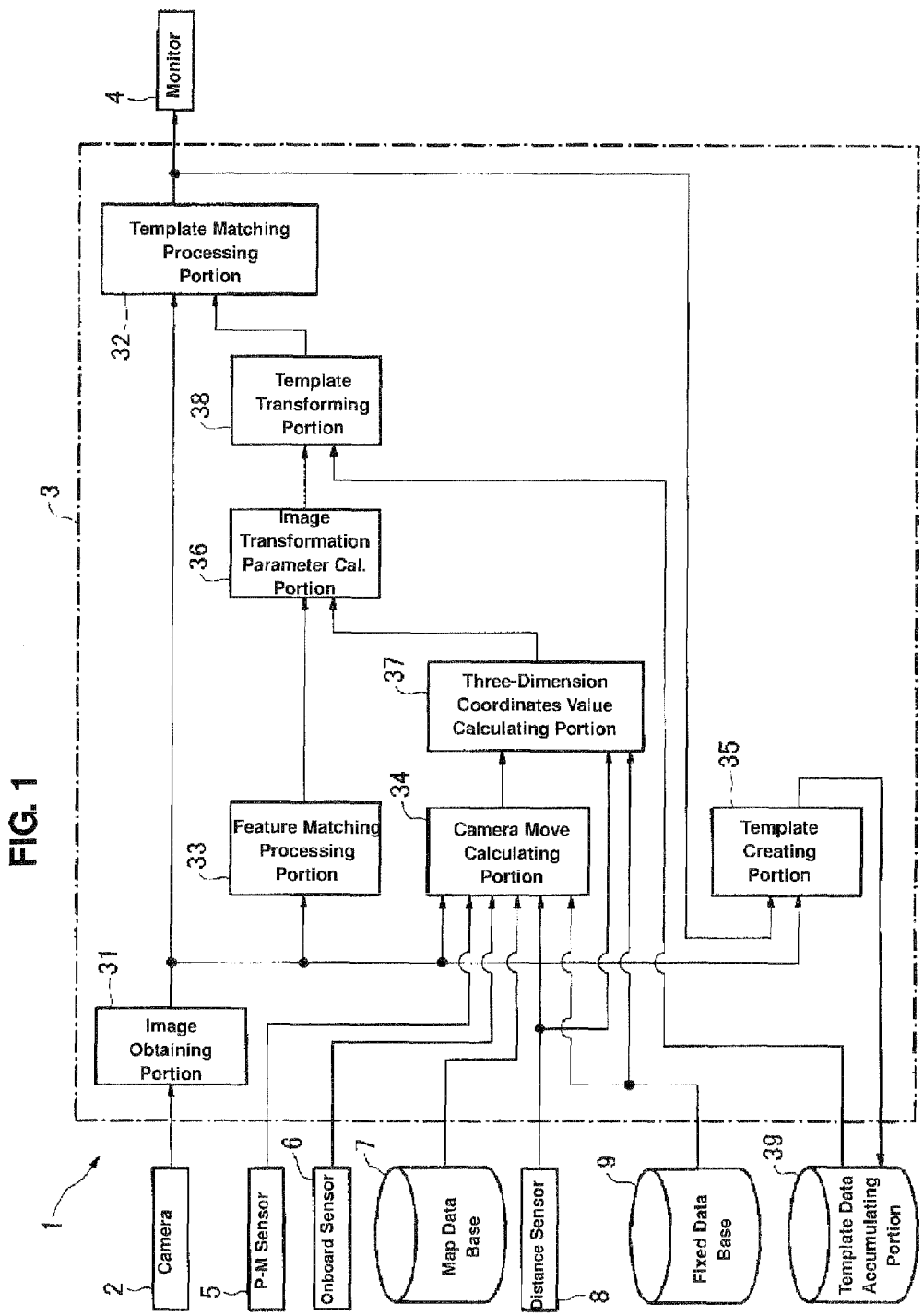
FIG. 1 is a structure diagram of an image processing device for a vehicle according to a first embodiment of the present invention.

A first embodiment will be described referring to FIGS. 1 through 13. An image processing device for a vehicle 1 of the present embodiment comprises, as shown in FIG. 1, a camera 2, a controller 3, a monitor 4, a position measuring sensor 5, an onboard sensor 6, a map data base 7, a distance sensor 8, and a fixed data base 9. The camera 2, which is an image picking-up means, such as a CCD camera or a CMOS camera, is installed in a vehicle 10 at a specified level so as to face to the right side of the vehicle, for example (see FIG. 2). The camera 2 picks up an image on the vehicle's right with a specified frame rate. This frame image picked up is outputted to the controller 3. The monitor 4, which is an indicating device such as LCD, indicates the frame image from the controller 3 for a driver. The position-measuring sensor 5, which is a sensor to measure vehicle position-measuring data, such as GPS or INS, outputs its position-measuring data to the controller 3. Position-measuring changes of the vehicle 10 and the camera 2 installed in the vehicle 10 are detectable from this position-measuring data. The onboard sensor 6, which comprises sensors which measure the vehicle's move amount and its change, such as a vehicle speed, vehicle acceleration, yaw angle, roll angle, pitch angle, and angle speed, outputs its measuring data to the controller 3. Position changes of the vehicle 10 and the camera 2 installed in the vehicle 10 are detectable from this measuring data. The map data base 7, which comprises a memory device, such as HDD, stores map data to identify the position of the own vehicle by combining the position-measuring data from the position-measuring sensor 5 and the like, and outputs this map data to the controller 3.

The distance sensor 8, which comprises a lazar radar, millimeter-wave radar, infrared TOF device, or the like, outputs distance data to any object to the controller 3. The fixed data base 9, which comprises a memory devise such as HDD, memorizes road sign information, traffic signal information, number-plate information, landmark information, and outputs such data to the controller 3. This information contains shapes, sizes and dimensions of road signs, traffic signals, number plates, and landmarks. The controller 3 is disposed in the vehicle 10 and comprises a micro computer equipped with CPU, memory storing program and the like, and so on. The controller 3 executes an image recognizing processing for the frame image supplied from the camera 2 to recognize the object, such as road signs, and outputs the frame image containing the recognized object to the monitor 4. Herein, the object to be recognized may be other things than the road signs, for example, road guide indications, traffic restriction indications, traffic congestion indications, traffic signals, marks on roads, landmarks, and so on.

In the present embodiment, the controller 3 comprises an image obtaining portion 31, a template matching processing portion 32, a feature matching processing portion 33, a camera move calculating portion 34, a template creating portion 35, an image transformation parameter calculating portion 36, a three-dimension coordinates-value calculating portion 37, and a template transforming portion 38. The controller 3 functions with the execution of the program of the CPU. The controller 3 further includes a template data accumulating portion 39 which is a memory means which is comprised of HDD or the like. The image obtaining portion 31 obtains the frame image from the camera 2, and outputs the frame image to the respective functional portions for various processing. The template creating portion 35 receives the frame image from the camera 2, extracts the image of the object image, such as road signs, from the frame image, create a basic template for the template matching processing, and save it at the template data accumulating portion 39.

The feature matching processing portion 33 extracts a feature in an image area containing the object image area for creating the basic template from the flame image received, and executes matching of the features in the plural frame images. The camera move calculating portion 34 receives the frame image from the image obtaining portion 31, the position-measuring data from the position-measuring sensor 5, the measuring data from the onboard sensor 6, the map data from the map data base 7, and the distance data from the distance sensor 8, respectively. The portion 34 calculates the amount of move of the camera 2 with the data received. The three-dimension coordinates-value calculating portion 37 calculates a three-dimension coordinates value of the feature in the frame image based on the camera's move amount, the distance data and the like. The image transformation parameter calculating portion 36 calculates an image transformation matrix for image transformation with correspondence of the frame images according to the camera's move amount and the distance to the object. The template transformation portion 38 creates a transformation template by transforming the basic template with the transformation matrix. The template matching processing portion 32 executes a template matching processing for the frame image with the transformation template in order to detect the object.

Figure 2:
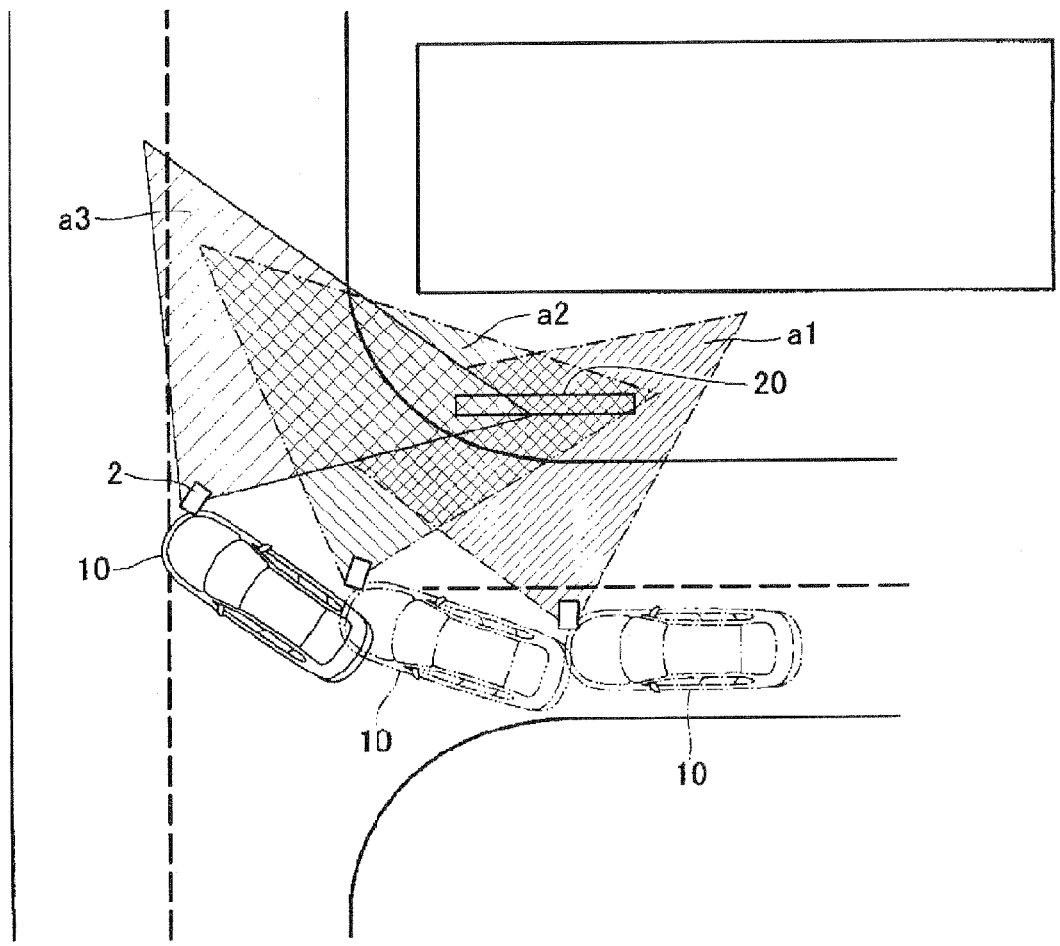
FIG. 2 is an explanatory diagram at a frame-image picking-up time according to the present embodiment.
Figure 3A:
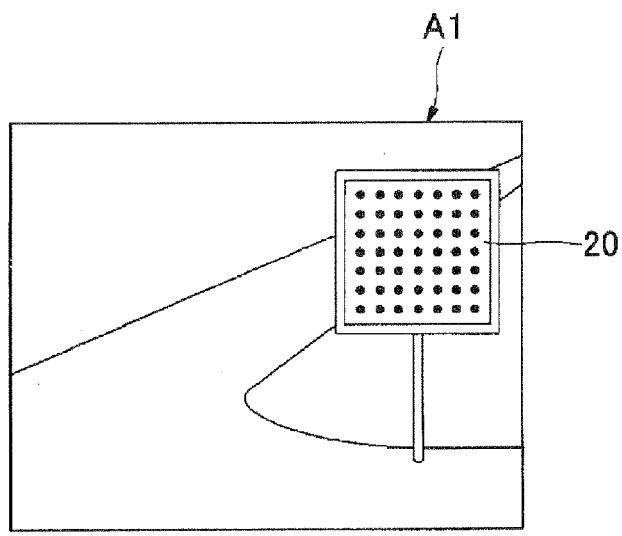
FIGS. 3A-3C are frame images which are picked up by a camera of FIG. 2.
Figure 3B:
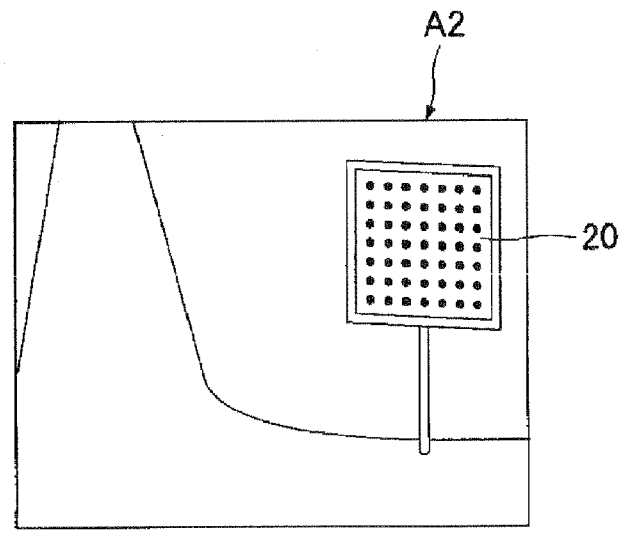
Figure 3C:
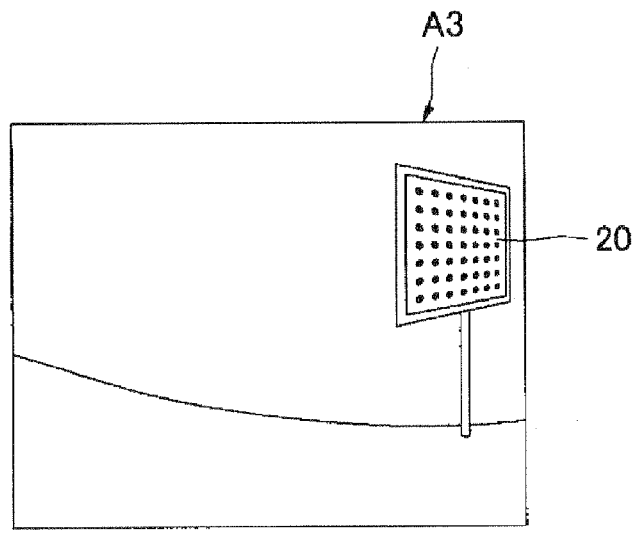

FIG. 2 illustrates a state in which the vehicle 10 turns to the right at an intersection of a T-shaped road at the time t1 through t3. The camera 2 of the vehicle 10 captures a sign 20 in its respective view fields a1, a2 and a3 at the respective times t1, t2 and t3. FIGS. 3A, 3B and 3C illustrate frame images A1, A2 and A3 at the times t1, t2 and t3. The sign 20 is a substantially square and flat-plate shaped marker plate. A square frame is painted on a plane of the sign, and plural dots are drawn inside the square frame as shown. Herein, the sign 20 is picked up by the camera 2 from the front in such a manner that its image is located in the camera's view field a1 at the time t1 so as to extend rearward from the center of the camera's view field as shown. The contour of the sign 20 in the frame image is substantially square. Further, the sign 20 is picked up in such a manner that its image is located at the rear in the camera's view field a2 at the time t2. Herein, an angle between the direction of a light axis of the camera 2 and the direction of a normal line of the sign 20 on the sign plane is approximately 20 degrees. The contour of the sign 20 in the frame image A2 is slightly distorted to a shape like a rhomb. Further, the sign 20 is picked up in such a manner that its image is located near the rear end in the camera's view field a3 at the time t3. Herein, an angle between the direction of the light axis of the camera 2 and the direction of the normal line of the sign 20 on the sign plane is approximately 40 degrees. The contour of the sign 20 in the frame image A3 is further distorted to a shape like a trapezoid. As described above, the image distortion of the contour of the sign 20 viewed in the frame image may change according to the magnitude of the relative move amount between the camera 2 and the sign 20. Further, even if the move distance is equal, the degree of image distortion of the sing 20 in the frame image becomes smaller in case the distance between the camera 2 and the sign 20 is greater (further), while the degree of image distortion becomes greater in case that distance is smaller (closer).

Hereinafter, the image transformation will be described. In case images of an identical object is picked up from different positions, the picked-up images of the identical object should correspond to each other if a proper image transformation between the frame images is executed. In general, the image transformation comprises the projective transformation, the affine transformation, the analogous transformation, and the Euclid transformation. The Euclid transformation is the one in which the rotation and the translation are applied to the image of the object which is projected on the two-dimension plane. The analogous transformation is the one in which the scale transformation (expansion/reduction) is added to the Euclid transformation. The affine transformation is the one in which the shearing distortion is added to the analogous transformation. Herein, the shearing distortion is like the one in which the square is changed to the rhomb. The projective transformation is the one in which the fan-shaped distortion is added to the affine transformation. Herein, in the fan-shaped distortion, the linearity is maintained, but the nature of being parallel or perpendicular is not. Accordingly, these have relationships of inclusion in such a manner that the Euclid transformation is included by the analogous transformation, the analogous transformation is included by the affine transformation, the affine transformation is included by the projective transformation (the projective transformation>the affine transformation>the analogous transformation>the Euclid transformation).

In the example of FIGS. 2 and 3A-3C, the sign image of FIG. 3B is distorted to the shape like the rhomb, in addition to the analogous distortion according to the distance change, relative to the sign image of FIG. 3A. Accordingly, the perfect matching of the sign image of FIG. 3B to an image which is obtained with the analogous transformation of the sign image of FIG. 3A cannot be provided, but its perfect matching can be provided with the affine transformation. Meanwhile, the sign image of FIG. 3C is distorted to the shape like the trapezoid, in addition to the analogous distortion according to the distance change, relative to the sign image of FIG. 3A. Accordingly, the perfect matching of the sign image of FIG. 3C to an image which is obtained with the analogous transformation or the affine transformation of the sign image of FIG. 3A cannot be provided, but its perfect matching can be provided with the projective transformation.

The present embodiment has the feature that the object, such as the sign 20, is continuously recognized in the frame image from the camera 2, considering phenomena in which the distortion degree of the sign 20 and the like in the frame image changes according to the move amount and the distance between the camera 2 and the object. According to the present embodiment, the basic template of the sign 20 is created based on the frame image at the specified time, and in the frame image which is subsequently received, the proper type of image transformation is selected according to the move amount and the distance between the camera 2 and the object. Then, the image transformation matrix is calculated in the selected type of image transformation, the basic template is transformed with this matrix, and the object is continuously recognized by the data matching processing with the transformed template. Herein, whether the move amount is great or small is determined not simply by the distance of the relative move between the camera 2 and the object. The small move amount means that the translation (move) is small and the rotational move is small. Meanwhile, the great move amount means that the translation (move) is great or the rotational move is great. Further, the move amount means the relative move between the two frame images. Accordingly, for example, even when the vehicle 10 travels at a low speed, the move amount between the frame images should be great in case the frame rate of the camera 2 is low or the frame distance is great.

Hereinafter, the selection of image transformation will be described. According to the present embodiment, either of the analogous transformation, affine transformation, and projective transformation is selected as the image transformation, and the transformation template is calculated by transforming the basic template with the transformation matrix which is calculated by the selected image transformation as described below.

The analogous transformation matrix Hs on the two image planes may be generally described by the following 3×3 matrix equation. Herein, since this can be determined if the rotational angle θ, the translation element (Tx, Ty), and the scale factor s are given, the degree of freedom is the four.

[Equation 1]

$$Hs = \begin{bmatrix} s & 0 & 0 \\ 0 & s & 0 \\ 0 & 0 & 1 \end{bmatrix} \begin{bmatrix} \cos\theta & -\sin\theta & Tx \\ \sin\theta & \cos\theta & Ty \\ 0 & 0 & 1 \end{bmatrix} \quad (1)$$

Likewise, the affine transformation matrix Ha may be described by the following 3×3 matrix equation using Ha=HsD (herein, the shearing transformation matrix D). The shearing transformation matrix can be determined if the rotational angle τ and the ratio σ of expansion (reduction) with respect to the x direction are given. Accordingly, the degree of freedom of the affine transformation matrix Ha is the six. In the following equation 2, $h_{ij}$ is a variable.

[Equation 2]

$$Ha = \begin{bmatrix} h_{11} & h_{12} & h_{13} \\ h_{21} & h_{22} & h_{23} \\ 0 & 0 & 1 \end{bmatrix} \quad (2)$$

[Equation 3]

$$D = \begin{bmatrix} \cos\tau & \sin\tau & 0 \\ -\sin\tau & \cos\tau & 0 \\ 0 & 0 & 1 \end{bmatrix} \begin{bmatrix} \sigma & 0 & 0 \\ 0 & 1 & 0 \\ 0 & 0 & 1 \end{bmatrix} \begin{bmatrix} \cos\tau & -\sin\tau & 0 \\ \sin\tau & \cos\tau & 0 \\ 0 & 0 & 1 \end{bmatrix} \quad (3)$$

Likewise, the projective transformation matrix Hp may be described by the following 3×3 matrix equation using Hp=HaB (herein, the fan-shaped distortion matrix B). The degree of freedom of the fan-shaped distortion matrix is the two. Accordingly, the degree of freedom of the projective transformation matrix Hp is the eight. In the following equations 4, and 5, $h_{ij}$, α, and β are a variable, respectively. Herein, while the projective transformation matrix Hp has nine elements $h_{ij}$, the same transformation may be provided even if all of these elements are multiplied by a constant. Accordingly, the degree of freedom of the projective transformation matrix Hp should be the eight.

[Equation 4]

$$Hp = \begin{bmatrix} h_{11} & h_{12} & h_{13} \\ h_{21} & h_{22} & h_{23} \\ h_{31} & h_{32} & h_{33} \end{bmatrix} \quad (4)$$

[Equation 5]

$$B = \begin{bmatrix} 1 & 0 & 0 \\ 0 & 1 & 0 \\ \alpha & \beta & 1 \end{bmatrix} \quad (5)$$

Accordingly, the analogous transformation has the lowest calculation load, and the projective transformation has the highest calculation load. The calculation load of the affine transformation is middle between them. The projective transformation contains the other transformations as described above, so the template matching is possible regardless of the above-described move amount and distance by setting all transformations to the projective transformation. In this case, however, the calculation load may always become high. Thus, the present embodiment is configured so that the transformation having the lowest calculation load is selected among the ones which enable the template matching. Herein, the following four scenes may be considered as the image picking-up situation (relationship between the camera 2 and the object). The scene 1 is a case in which the camera 2 and the object are stationary. The scene 2 is a case in which the camera 2 is moving and the object is stationary. The scene 3 is a case in which the camera 2 is stationary and the object is moving. The scene 4 is a case in which both the camera 2 and the object are moving.

In the case of the scene 1, there is no position change of the object between the continuous frame images, so the perfect template matching is possible. In the case of the scene 2, the influence of the shearing distortion or the fan-shaped distortion may be small when the move amount of the camera 2 is small and the distance between the camera 2 and the object is great (far), so the analogous transformation is selected. Further, while the influence of the shearing distortion may occur when the move amount is small and the distance is small (close) or when the move amount is great and the distance is great (far), the affine transformation is selected because the influence of the fan-shaped distortion is small. Moreover, the influence of the fan-shaped distortion may occur when the move amount is great and the distance is small, so the projective transformation is selected.

There is only a difference in the relative move of the camera 2 to the object between the above-described scene 2 and the scene 3 in that the camera 2 moves or the object moves. Accordingly, the scene 3 may be recognized substantially in the same manner as the scene 2. Thus, in the case of the scene 3, the analogous transformation is selected when the above-described move amount is small and the above-described distance is great (far). The affine transformation is selected when the move amount is small and the distance is small (close) or when the move amount is great and the distance is great (far). The projective transformation is selected when the move amount is great and the distance is small.

In the case of the scene 4, the move amount of the camera 2 is calculated, and the image is modified based on this move amount so as to be transferred to the image similar to the one which is picked up by the camera 2 in the stationary state. Then, the processing can be executed by adopting the case in which the camera 2 is stationary and the object is moving in the case of the scene 3. Hereinafter, the scene 2 will be described as a representative example for easy understanding.

Subsequently, the calculating processing of the move amount of the camera 2 and the distance between the camera 2 and the object will be described. The camera move calculating portion 34 of the controller 3 of the present embodiment receives the position-measuring data from the position-measuring sensor 5 at the time t1 and the time t2, for example, and the move amount of the camera 2, that is, the rotational move element R and the translation (move) element t are calculated based on the time change of the position-measuring data. Herein, the controller 3 may be configured so that the move amount of the camera 2 is calculated from the sensing signals from the onboard sensor 6, such as the vehicle speed sensor, angle sensor, acceleration sensor. Further, the camera move calculating portion 34 may be configured to calculate the distance to the object based on the distance data from the distance sensor 8. Additionally, the camera move calculating portion 34 may be configured to calculate the three-dimension coordinates value of the feature of the object at the time t2 based on the above-described calculated move amount of the camera 2 in case the three-dimension coordinates value of the feature of the object at the time t1, for example, is calculated by the other processing. Thus, the camera move calculating portion 34 can calculate the distance to the object from the three-dimension coordinates value calculated.

Figure 5:
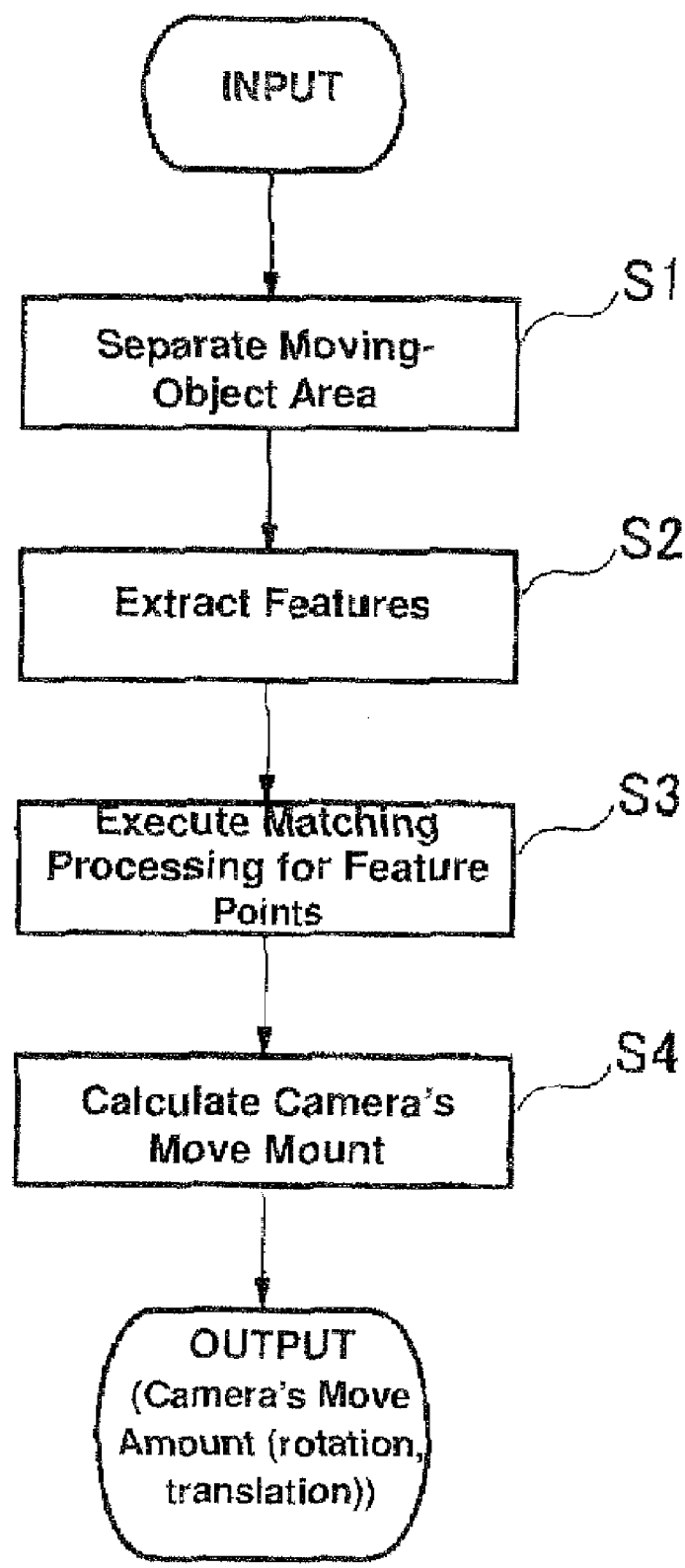
FIG. 5 is a flowchart of calculating processing of a camera's move amount according to a modified example of the present embodiment.

Further, as a further alternative, the move amount may be calculated with a method by image processing, a method using the distance data, or a method using known information. In the method by image processing, the move amount can be calculated by using the eight-point algorism, for example, as shown in FIG. 5. In this processing, the controller 3 separates respective image areas of the moving object, not the stationary object, from the frame image A1 and the frame image A2 which were received at the time t1 and the time t2, respectively (step S1). Then, the controller 3 extracts the respective features from the frame images which have been separated by some known method (step S2). Harris operator, SUSAN operator, Foerstner operator, Sojka operator, SIFT, or the like may be used as this feature-extraction method. Next, the controller 3 executes matching processing for matching the eight or more feature points between the frame images with some known method (step S3). Methods of using brightness correlation, brightness inclination correlation, phase limitation correlation, feature amount correlation, SIFT's correlation or the like may be used as the method of this feature matching. Then, the controller 3 calculates the fundamental matrix and the basic matrix based on the eight or more feature points and the known internal camera parameters and the like, and calculates the rotational move element R and the translation (move) element t of the camera 2 by solving the basis matrix with the unique-value resolution method or the like (step S4). Herein, the scale may be determined based on the disposition height of the camera 2 which is obtained by detecting the road surface from the frame images, or the distance data from the distance sensor 8 may be used for the scale determination.

Figure 6:
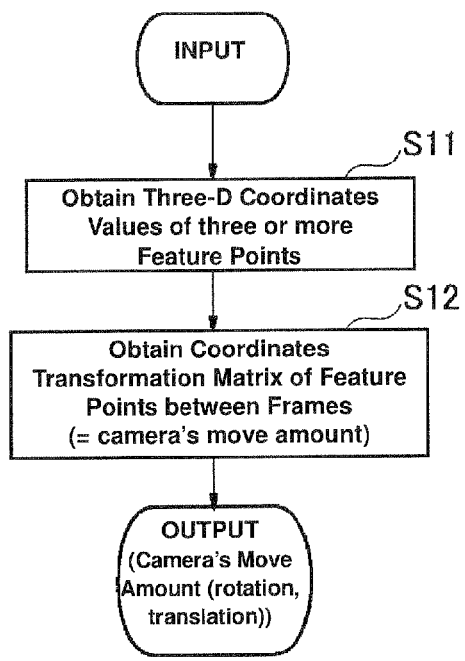
FIG. 6 is a flowchart of calculating processing of the camera's move amount according to another modified example of the present embodiment.
Figure 7:
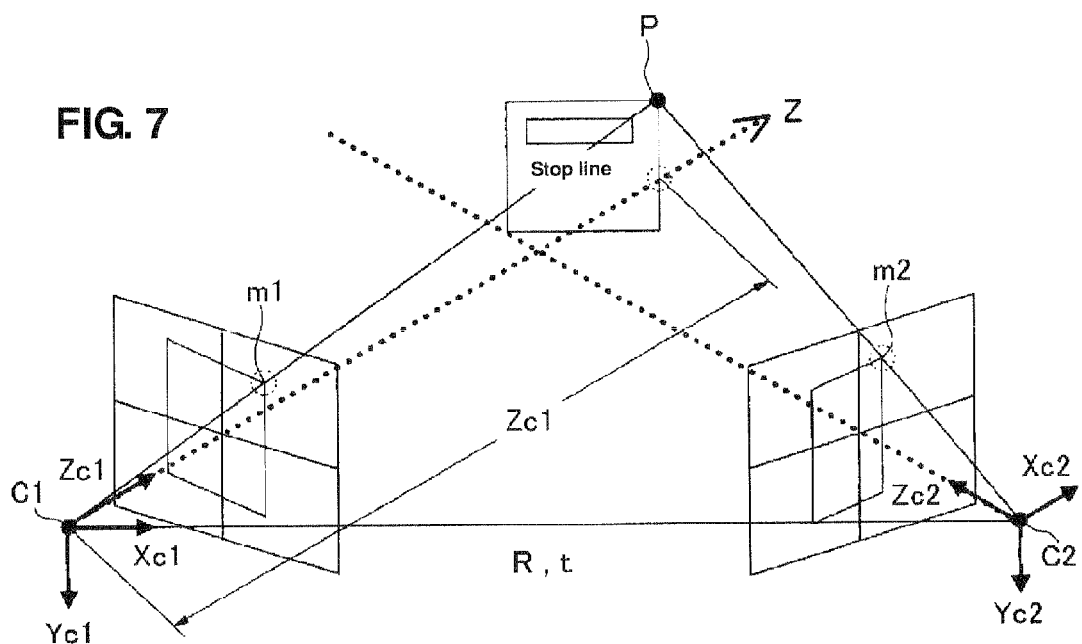
FIG. 7 is an explanatory diagram of calculating processing of the camera's move amount according to further another modified example of the present embodiment.

Further, in the method using the distance data, as shown in FIG. 6, the controller 3, after receiving the frame image A1 at the time t1 and then receiving the frame image A2 at the time t2, extracts three or more corresponding feature points from these frame images, obtain the distance to the feature points based on the distance data from the distance sensor 8 and a known focus distance f, and calculates the three-dimension coordinates values of these feature points (step S11). Then, the controller 3 calculates the coordinates transformation matrix of the feature points between the frame images (between the camera coordinates system) from the three-dimension coordinates values of the three or more feature points, and calculates the rotational move element R and the translation (move) element t of the camera 2 (step S12). Moreover, in the method using the known information, as shown in FIG. 7, the controller 3 uses length information of the sign and the like which is known. This known information has been memorized at the fixed data base 9. An example of FIG. 7 illustrates a case in which the sign having the known length, its vertical and lateral dimensions of 60 cm, is captured in the frame images A1 and A2. The camera coordinates system at the time t1 is C1 (Xc1, Yc1, Zc1), and the camera coordinates system at the time t2 is C2 (Xc2, Yc2, Zc2). A space point P (X, Y, Z) on the sign plate is recognized as the image coordinates values m1 (u1, v1), m2 (u2, v2) on the respective image planes. In this case, the length of respective sides of the sign image on the image plane is equivalent to 60 cm actually. Accordingly, the controller 3 can calculate the three-dimension coordinates values of the three or more feature points from the analogous relation by using the known focus distance f as well. Thereby, the rotational move element R and the translation (move) element t of the camera 2 can be calculated by the same processing as the above-described other methods.

Hereinafter, the calculating processing of the transformation matrix will be described. First, the image transformation parameter calculating portion 36 calculates the projective transformation matrix from the move amount (rotation R, translation t) of the camera and the distance to at least one of the feature points. As an alternative example, the image transformation parameter calculating portion 36 may calculate the projective transformation matrix from the three-dimension coordinates values of at least three corresponding points in the frame images. In this case, since the degree of freedom of the projective transformation matrix is the eight as described above, at least nine restrictions may be obtained because the three-axis elements correspond at the three-dimension coordinates values of at least the three points. Thereby, the linear solution may be possible.

Further, the image transformation parameter calculating portion 36 may calculate the projective transformation matrix from the image coordinates values of at least corresponding four points in the frame images. In this case, since two-axis elements correspond at the image coordinates values of at least the four points, at least eight restrictions may be obtained. Thereby, the linear solution may be possible. Further, in case the object is identified as a plane-shaped object, the image transformation parameter calculating portion 36 may calculate the projective transformation matrix from the normal-line vector and the three-dimension coordinates value of at least one point. The image transformation parameter calculating portion 36 calculates the affine transformation matrix from the move amount (rotation R, translation t). As an alternative example, the image transformation parameter calculating portion 36 may calculate the affine transformation matrix from the three-dimension coordinates values of at least two corresponding points in the frame images. In this case, since the degree of freedom of the affine transformation matrix is the six as described above, at least six restrictions may be obtained at the three-dimension coordinates values of at least the two points. Thereby, the linear solution may be possible.

Further, the image transformation parameter calculating portion 36 may calculate the affine transformation matrix from the image coordinates values of at least corresponding three points in the frame images. In this case, since at least six restrictions may be obtained at the image coordinates values of at least the three points, the linear solution may be possible. Further, in case the object is identified as the plane-shaped object, the image transformation parameter calculating portion 36 may calculate the affine transformation matrix from the normal-line vector and the three-dimension coordinates value of at least one point like the projective transformation matrix. The image transformation parameter calculating portion 36 calculates the analogues transformation matrix from the move amount (rotation R, translation t). As an alternative example, the image transformation parameter calculating portion 36 may calculate the analogous transformation matrix from the three-dimension coordinates values of at least two corresponding points in the frame images. In this case, since the degree of freedom of the analogous transformation matrix is the four as described above, at least six restrictions may be obtained at the three-dimension coordinates values of at least the two points. Thereby, the linear solution may be possible.

Further, the image transformation parameter calculating portion 36 may calculate the analogous transformation matrix from the image coordinates values of at least corresponding two points in the frame images. In this case, since at least four restrictions may be obtained at the image coordinates values of at least the two points, the linear solution may be possible. Further, in case the object is identified as the plane-shaped object, the image transformation parameter calculating portion 36 may calculate the analogous transformation matrix from the normal-line vector and the three-dimension coordinates value of at least one point like the projective transformation matrix. Herein, the feature points which are used for the calculation of the transformation matrix may be the feature points of the object in the frame images or not. That is, any transformation matrix which is calculated by using any corresponding feature points in the frame images is applicable to transformation of the basic template which will be described later.

Since the affine transformation matrix and the analogous transformation matrix are the matrix containing the rotational angle and translation elements as described above, these can be calculated if the move of the camera 2 is known. Herein, the scale factor and the expansion (reduction) ratio may be calculated from the move amount of the camera 2 or by using the measuring data from the distance sensor 8 and the like. Thus, these transformation matrixes are calculated from the camera's move and the transformations of the image planes at the different times, so these transformations are common in the whole image planes. Accordingly, there is no need of calculating the transformation matrix for each object.

Since the projective transformation matrix contains the variables $\alpha$, $\beta$ in addition to the rotational angle and translation elements as described above, it cannot be determined only from the camera's move. Referring to FIG. 7, if the distance Zc1 to the object is known in the camera coordinates system C1, the image plane coordinates value (x1, y1) can be obtained as described below from the image coordinates value m1 (u1, v1) of the object which has read from the frame image A1 at the time t1 and the internal camera parameter A which is described in the known 3×3 matrix. Further, the three-dimension coordinates values Xc1, Yc1 can be calculated.

[Equation 6]

$$\begin{bmatrix} x_1 \\ y_1 \\ 1 \end{bmatrix} = A^{-1} \begin{bmatrix} u_1 \\ v_1 \\ 1 \end{bmatrix} \quad (6)$$

[Equation 7]

$$X_{c1} = x_1 \cdot Z_{c1}$$
$$Y_{c1} = y_1 \cdot Z_{c1} \quad (7)$$

If the move amount (rotational move element R, translation move element t) is given, the three-dimension coordinates value (Xc1, Yc1, Zc1) can be transformed to the three-dimension coordinates value (Xc2, Yc2, Zc2) of the camera coordinates system C2 by the following equation.

[Equation 8]

$$\begin{bmatrix} X_{c2} \\ Y_{c2} \\ Z_{c2} \end{bmatrix} = R^{-1} \cdot \begin{bmatrix} X_{c1} \\ Y_{c1} \\ Z_{c1} \end{bmatrix} - R^{-1} \cdot T \quad (8)$$

Further, the image plane coordinates value (x2, y2) corresponding to the image coordinates value (u2, v2), and the image coordinates value (u2, v2) are expressed as follows. Herein, the distance to the object in the camera coordinates system C2 is set as Zc2.

[Equation 9]

$$x_2 = X_{c2}/Z_{c2}$$
$$y_2 = Y_{c2}/Z_{c2} \quad (9)$$

[Equation 10]

$$\begin{bmatrix} u_2 \\ v_2 \\ 1 \end{bmatrix} = A \begin{bmatrix} x_2 \\ y_2 \\ 1 \end{bmatrix} \quad (10)$$

The equations 6 through 8 can be rewritten as the following equation 11.

[Equation 11]

$$\begin{bmatrix} X_{c2} \\ Y_{c2} \\ Z_{c2} \\ 1 \end{bmatrix} = \begin{bmatrix} R^{-1} & -R^{-1}T \\ O^T & 1 \end{bmatrix} \begin{bmatrix} Z_{c1} & 0 & 0 & 0 \\ 0 & Z_{c1} & 0 & 0 \\ 0 & 0 & Z_{c1} & 0 \\ 0 & 0 & 0 & 1 \end{bmatrix} \begin{bmatrix} A^{-1} & O \\ O^T & 1 \end{bmatrix} \begin{bmatrix} u_1 \\ v_1 \\ 1 \\ 1 \end{bmatrix} \quad (11)$$

Further, the equations 9 and 10 can be rewritten as the following equation 12.

[Equation 12]

$$\begin{bmatrix} u_2 \\ v_2 \\ 1 \\ 1 \end{bmatrix} = \begin{bmatrix} A & O \\ O^T & 1 \end{bmatrix} \begin{bmatrix} 1/Z_{c2} & 0 & 0 & 0 \\ 0 & 1/Z_{c2} & 0 & 0 \\ 0 & 0 & 1/Z_{c2} & 0 \\ 0 & 0 & 0 & 1 \end{bmatrix} \begin{bmatrix} X_{c2} \\ Y_{c2} \\ Z_{c2} \\ 1 \end{bmatrix} \quad (12)$$

Moreover, the following equation 13 can be obtained by combining the equations 11 and 12.

[Equation 13]

$$\begin{bmatrix} u_2 \\ v_2 \\ 1 \\ 1 \end{bmatrix} = \begin{bmatrix} A & O \\ O^T & 1 \end{bmatrix} \begin{bmatrix} 1/Z_{c2} & 0 & 0 & 0 \\ 0 & 1/Z_{c2} & 0 & 0 \\ 0 & 0 & 1/Z_{c2} & 0 \\ 0 & 0 & 0 & 1 \end{bmatrix} \begin{bmatrix} R^{-1} & -R^{-1}T \\ O^T & 1 \end{bmatrix}$$
$$\begin{bmatrix} Z_{c1} & 0 & 0 & 0 \\ 0 & Z_{c1} & 0 & 0 \\ 0 & 0 & Z_{c1} & 0 \\ 0 & 0 & 0 & 1 \end{bmatrix} \begin{bmatrix} A^{-1} & O \\ O^T & 1 \end{bmatrix} \begin{bmatrix} u_2 \\ v_2 \\ 1 \\ 1 \end{bmatrix} \quad (13)$$

In the equation 13, the fourth line of the first matrix of the right side is (0, 0, 0, 0), and the fourth row of that is (0, 0, 0, 1)$^T$. Accordingly, the equation 13 can be considered as 3×3 matrix and thus expressed as the following equation 14.

[Equation 14]

$$\begin{bmatrix} u_2 \\ v_2 \\ 1 \end{bmatrix} = Hp \begin{bmatrix} u_1 \\ v_1 \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} u_1 \\ v_1 \\ 1 \end{bmatrix} \quad (14)$$

Thus, the projective transformation matrix can be calculated by using the move amount (rotational angle, translation element) and the distance to the object. Herein, while the distance data is used for the calculation of the transformation matrix, the multiplication of the distance Zc1 of the camera coordinates system C1 and the division of the distance Zc2 of the camera coordinates system C2 are used in the process of obtaining the equation 14. Accordingly, the ratio of the distance, not the absolute value of the distance, is used. Further, the transformation matrix is for conducting the transformation between the image planes at the different times, so the transformation is common in the whole image planes. Accordingly, there is no need of calculating the transformation matrix for each object.

Figure 8:
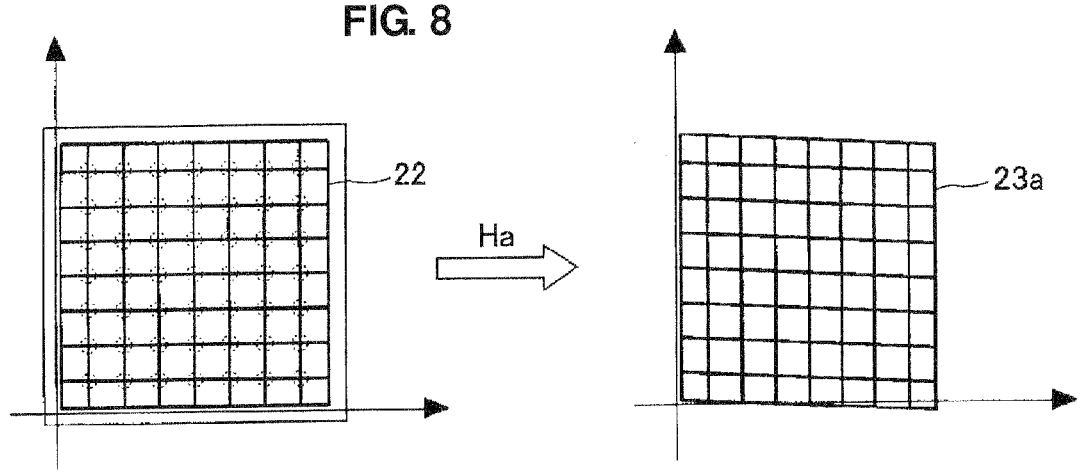
FIG. 8 is an explanatory diagram of a transformation template according to the present embodiment.

Next, the matching processing according to the present embodiment will be described. First, the controller 3 receives the frame image A1 from the camera 2 at the image obtaining portion 31 and outputs that to the template creating portion 35. The template creating portion 35 creates the basic template 22 by extracting the image area including the sign 20 from the frame image A1 as shown in FIG. 4. The crated basic template 22 is memorized at the template data accumulating portion 39. Herein, lines connecting the dots vertically and laterally are illustrated additionally on the basic template 22 in FIG. 4, which may be just for easy understanding. Then, when the controller 3 receives the frame image A2 from the camera 2, the image transformation parameter calculating portion 36 calculates the transformation matrix based on the move amount of the camera 2 and the distance between the object and the sign 20. Since the move amount of the camera 2 from the time t1 to the time t2 is small and the distance to the sign 20 is small (short) at the time t2, the image transformation parameter calculating portion 36 calculates the affine transformation matrix, that is, the six variables as shown in the equation 2 and obtains the transformation matrix. Then, as shown in FIG. 8, the template transforming portion 38 creates the transformation template 23a by transforming the basic template 22 with the obtained transformation matrix. Herein, the x axis and y axis, which are perpendicular to each other, are illustrated additionally in FIG. 8 and the other figures. Further, only lines connecting the contour, frame, and dots are illustrated for easy understanding in the transformation template in FIG. 8 and the others.

Figure 9A:
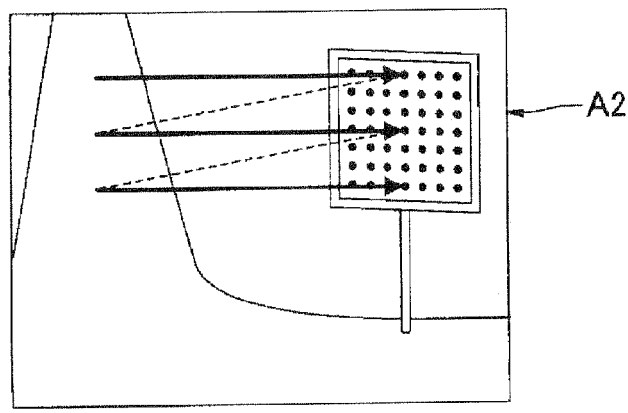
FIGS. 9A-9C are explanatory diagrams of template matching processing with the transformation template of FIG. 8.
Figure 9B:
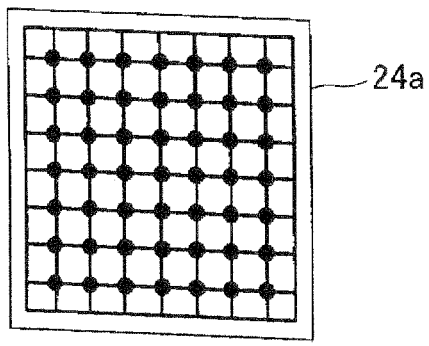
Figure 9C:
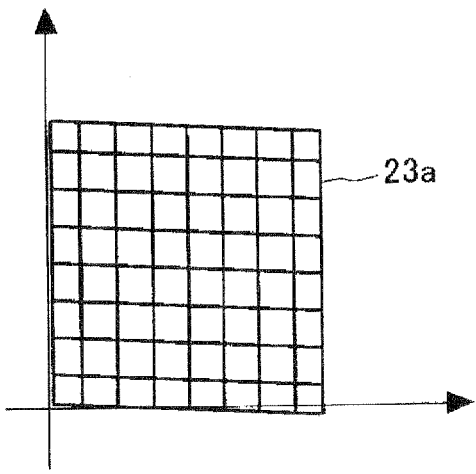

After the transformation template 23a is created, as shown in FIGS. 9A, 9B and 9C, the template matching processing portion 32 detects an image area which has a specified matching degree as the object, by executing the template matching processing with the transformation template 23a at the frame image A2. In the template matching processing, as shown in FIG. 9A, the whole area of the frame image A2 is scanned by moving the transformation template 23a one picture element by one picture element, thereby calculating correlation of brightness distribution, for example. Then, the image area which has the correlation which is higher than a specified value is detected as the object. In this case, the image area 24a shown in FIG. 9B and the transformation template 23a have the high correlation degree with each other in the frame image A2 of FIG. 9A, so the image area 24a is recognized as the object.

Figure 10:
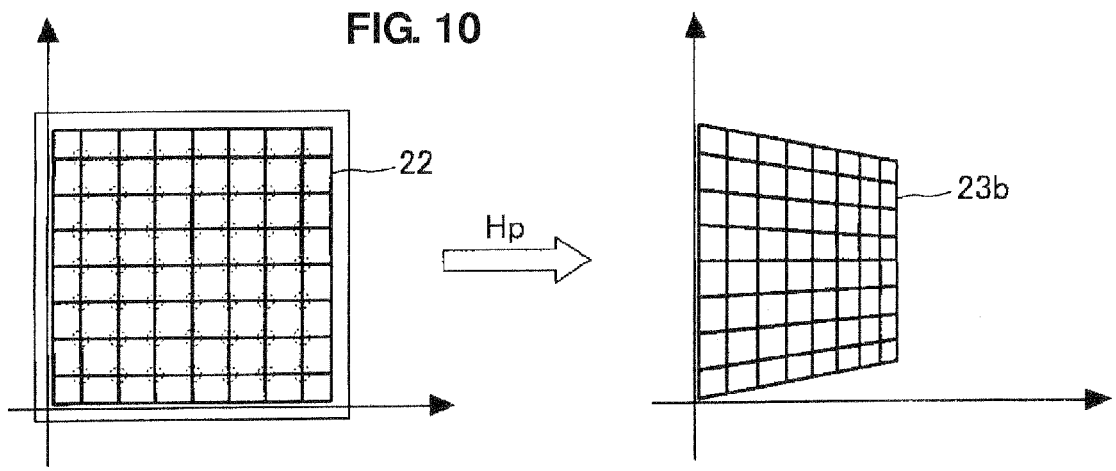
FIG. 10 is an explanatory diagram of a transformation template according to the present embodiment.
Figure 11A:
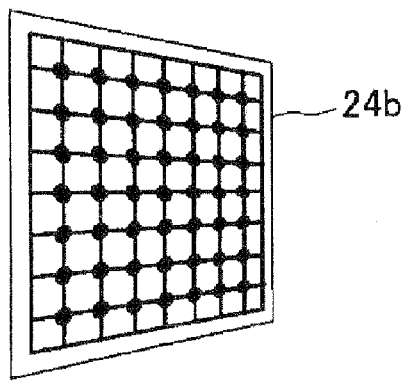
FIGS. 11A, 11B are explanatory diagrams of template matching processing with the transformation template of FIG. 10.
Figure 11B:
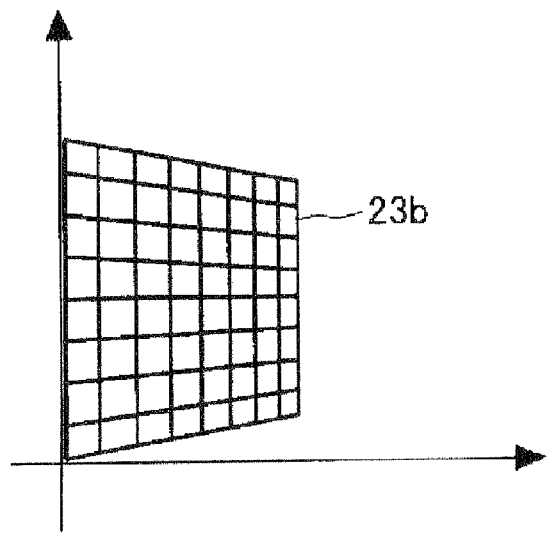
Figure 12A:
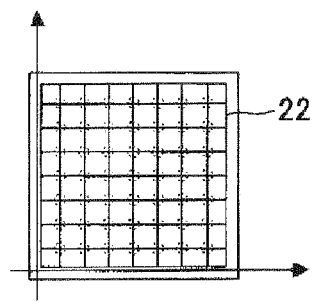
FIGS. 12A-12E are explanatory diagrams of a transformation template according to prior art.
Figure 12B:
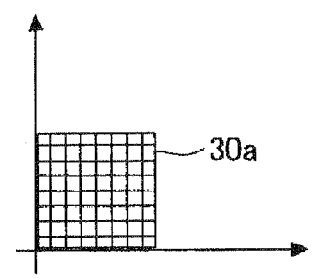
Figure 12C:
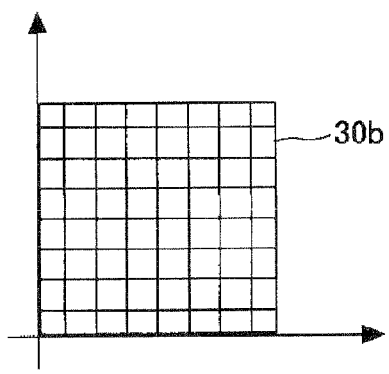
Figure 12D:
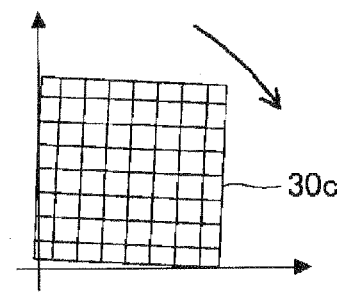
Figure 12E:
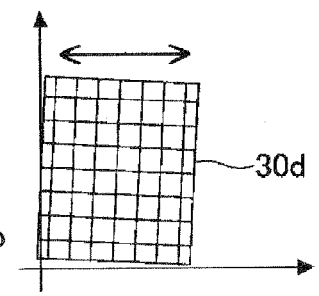
Figure 14:
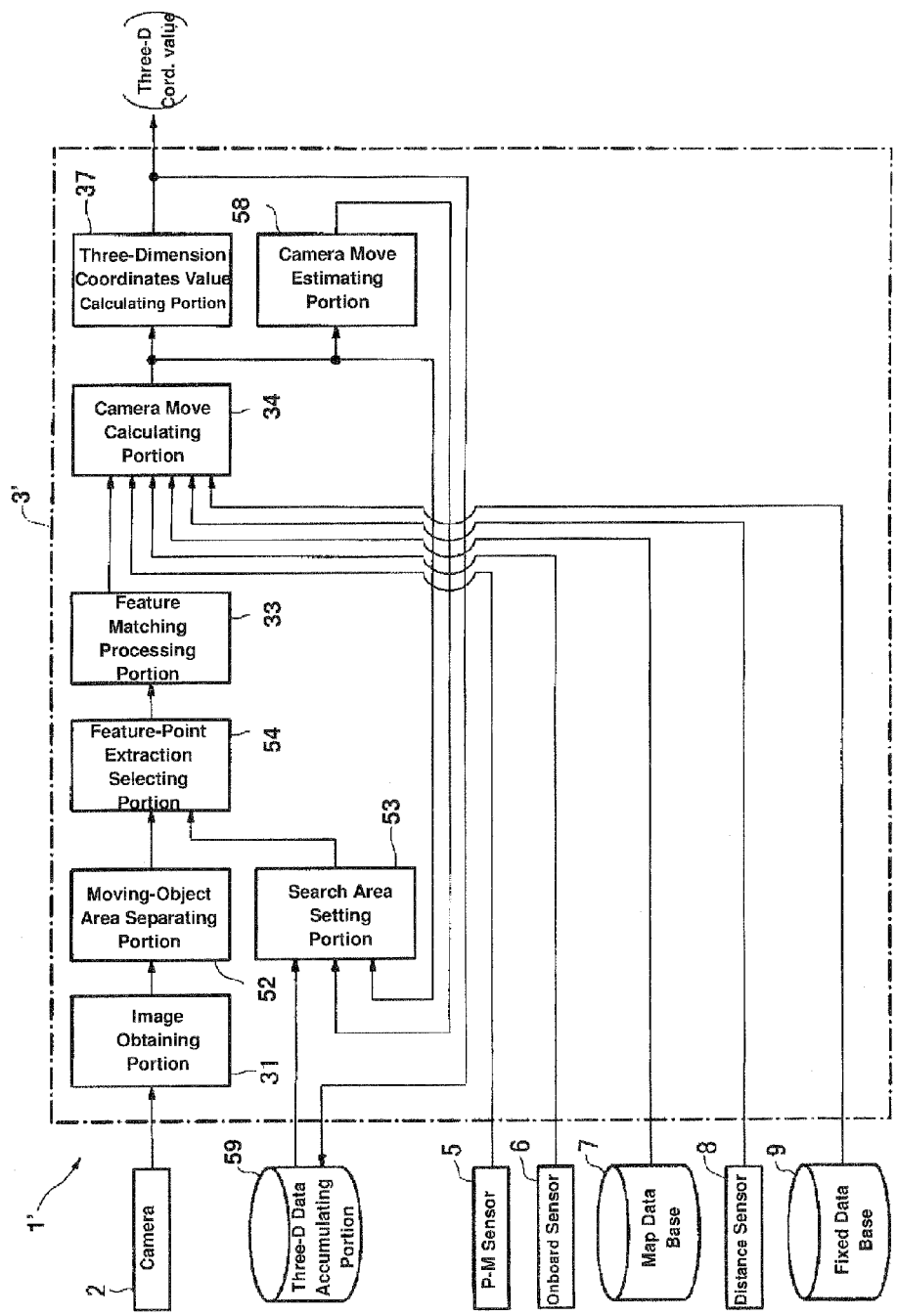
FIG. 14 is a structure diagram of an image processing device for a vehicle according to a second embodiment of the present invention.

Further, after the controller 3 receives the frame image A3 from the camera 2, the image transformation parameter calculating portion 36 calculates the transformation matrix based on the move amount of the camera 2 and the distance between the object and the sign 20. Since the move amount of the camera 2 from the time t1 to the time t3 is great and the distance to the sign 20 at the time t3 is short, the image transformation parameter calculating portion 36 calculates the projective transformation matrix, that is, the nine variables as shown in the equation 4 and obtains the transformation matrix. Then, as shown in FIG. 10, the template transforming portion 38 creates the transformation template 23b by transforming the basic template 22 with the obtained transformation matrix. After the transformation template 23b is created, the template matching processing portion 32 detects an image area which has a specified matching degree as the object, by executing the template matching processing with the transformation template 23b at the frame image A3. In this case, the image area 24b shown in FIG. 11A and the transformation template 23b have the high correlation degree with each other in the frame image A3 of FIG. 11A, so the image area 24b is recognized as the object.

Herein, for comparison with the prior art, the basic template 22 (FIG. 12A), a reduced template 30a (FIG. 12B), an expanded template 30b (FIG. 12C), a rotated template 30c (FIG. 12D), and a transformation plate 30d which is obtained by the transformation of rotation and length/breadth ratio (FIG. 12E) are shown in FIG. 12. A case in which these templates 30a-30d are applied to the frame image A3 is considered here. The image of the sign 20 in the image area 24b of the frame image A3 is distorted to a shape like a trapezoid. Accordingly, if the sign's upper side is in parallel to the sign's lower side and the sign's right side is in parallel to the sign's left side like the above-described templates 30a-30d, the high marching with the image area 24b may not be provided, so that the object cannot be recognized.

Next, the flowchart of the processing of the image processing device 1 according to the present embodiment will be described referring to FIG. 13. This processing is executed repeatedly by the controller 3. First, the image obtaining portion 31 of the controller 3 receives the frame image of the outside of the vehicle 10 which the camera 2 picked up (step S21). The image obtaining portion 31 determines whether the frame image received is a standard image (first image) or not (step S22). The image obtaining portion 31 determines that the frame image received is the standard image in case the frame image is picked up for the first time after the start of image picking up, for example. When the frame image received is the standard image (Yes in the step S22), the image obtaining portion 31 outputs this frame image to the feature matching processing portion 33, the camera move calculating portion 34, and the template creating portion 35. The template creating portion 35 extracts the image area of any object, such as the sign, from the frame image, and creates the basic template (step S23). Then, the control ends.

Meanwhile, when the frame image received is not the standard image (No in the step S22), the image obtaining portion 31 outputs this frame image to the feature matching processing portion 33, the camera move calculating portion 34, and the template creating portion 35. The feature matching processing portion 33 executes the matching processing between the feature points of the standard image and the feature points of the frame image received. The camera move calculating portion 34 calculates the distance to the feature points of the object in the image area which is estimated from the received frame image based on the measurement data from the distance sensor 8 and the like (step S24). Further, the camera move calculating portion 34 calculates the camera's move amount from the timing of receiving the standard image to the timing of receiving the frame image this time based on the measurement data from the onboard sensor 6 and the like, and the three-dimension coordinates-value calculating portion 37 calculates the three-dimension coordinates values of the feature points from the camera's move amount and the distance data (step S25). The image transformation parameter calculating portion 36 determines whether or not the camera's move amount is greater than the specified amount and the distance to the object is the specified distance or smaller (step S26). In the present embodiment, the focal distance f of the camera 2 is set to 8 mm, the frame rate is set to 30 fps, the camera's move amount is set to 20 yaw-angle degrees of the rotational move or 1m of translation (move), and the above-described specified distance is set to 50 m. Herein, these may be set freely. When the camera's move amount is greater than the specified amount and the distance to the object is the specified distance or smaller (Yes in the step S26), the image transformation parameter calculating portion 36 calculates the projective transformation matrix for the frame image from the standard image based on the camera's move amount, distance to the feature points, three-dimension coordinates values and so on (step S29). Meanwhile, when the camera's move amount is the specified amount or smaller or the distance to the object is greater than the specified distance (No in the step S26), the image transformation parameter calculating portion 36 determines whether or not the camera's move amount is the specified amount or smaller and the distance to the object is the specified distance or smaller (Yes in the step S27). When the camera's move amount is the specified amount or smaller and the distance to the object is the specified distance or smaller (Yes in the step S27), the image transformation parameter calculating portion 36 calculates the affine transformation matrix for the frame image from the standard image based on the camera's move amount and so on (step S30).

Meanwhile, when the camera's move amount is greater than the specified amount or the distance to the object is greater than the specified distance (Yes in the step S27), the image transformation parameter calculating portion 36 determines whether or not the camera's move amount is greater than the specified amount and the distance to the object is greater than the specified distance (step S28). When the camera's move amount is greater than the specified amount and the distance to the object is greater than the specified distance (Yes in the step S28), the image transformation parameter calculating portion 36 calculates the affine transformation matrix for the frame image from the standard image based on the camera's move amount and so on (step S31). Meanwhile, when the camera's move amount is the specified amount or smaller or the distance to the object is smaller than the specified distance (No in the step S28), the image transformation parameter calculating portion 36 calculates the analogous transformation matrix for the frame image from the standard image based on the camera's move amount and so on (step S32). The template transforming portion 38 creates the transformation template by transforming the basic template image with the image transformation matrix calculated by the image transformation parameter calculating portion 36 (step S33). The template matching processing portion 32 executes the template matching processing for the frame image which is received in this time's processing with this transformation template created (step S34). Thus, the controller 3 can detect the object which is identified by the basic template in the frame image received this time.

Herein, while the above-described embodiment shows an example in which a single object exits in the frame image, the present invention is applicable to another example in which plural objects exist. In this case, the same numbers of basic templates may be created accordingly. In case the image transformation matrix is calculated for a specified object of the objects, this image transformation matrix is useable in transforming the basic template for another object.

Embodiment 2

Hereinafter, a second embodiment of the present invention will be described referring to FIGS. 14 through 21. The same means or components as those in the above-described first embodiment are denoted by the same reference characters, and their detailed descriptions are omitted here. The present embodiment is substantially an alternative of part of the first embodiment which is shown with the flowchart of FIG. 5.

In the present embodiment, a controller 3' of an image processing device 1' for a vehicle comprises the image obtaining portion 31, a moving-object area separating portion 52, a search-area setting portion 53, a feature-point extraction selecting portion 54, the feature matching processing portion 33, the camera move calculating portion 34, the three-dimension coordinates-value calculating portion 37, and a camera move estimating portion 58. The controller 3' further comprises a three-dimension data accumulating portion 59 as a memory means which comprises a memory device, such as HDD.

Herein, the image obtaining portion 31, feature matching processing portion 33, camera move calculating portion 34, and three-dimension coordinates-value calculating portion 37 perform basically the same function as those described in the above-described first embodiment. The moving-object area separating portion 52 separates a moving-object image area from the frame image received from the image obtaining portion 31. The search-area setting portion 53 sets setting data for setting a search image area in searching points which correspond to the feature points of the frame image. The feature-point extraction selecting portion 54 extracts the feature points from the frame image and selects the specified numbers of feature points to be used for calculating the camera's move amount. The feature matching processing portion 33 detects corresponding points, which correspond to the feature points selected in the frame image, in another frame image. The camera move calculating portion 34 calculates the camera's move amount with the selected feature points and the corresponding points which correspond to these selected feature points. The three-dimension coordinates-value calculating portion 37 calculates the three-dimension coordinates value of surroundings of the vehicle based on the camera's move amount calculated. The camera move estimating portion 58 predicts the camera's move amount after a specified time has passed based on the camera's move amount calculated. The three-dimension data accumulating portion 59 accumulates the calculated three-dimension data.

Hereinafter, the processing of the present embodiment will be described. In the present embodiment, the image-obtaining portion 31 receives the frame images from the camera 2 every a specified time, and outputs them to the moving-object area separating portion 52. That is, the image-obtaining portion 31 receives the respective frame images $A_{-n}$, $A_{-(n-1)}$, - - - $A_{-1}$, $A_0$, $A_{+1}$, $A_{+2}$, - - - at the times (timing) $t_{-n}$, $t_{-(n-1)}$, - - - $t_{-1}$, $t_0$, $t_{+1}$, $t_{+2}$, - - - . The moving-object area separating portion 52 separates image parts of moving objects, such as other vehicles, from the frame images received every the specified time. This is because the image parts of moving objects may prevent the proper calculation of the camera's move amount. Thus, the moving-object area separating portion 52 outputs the rest of parts of the image frames, which is without the image parts of moving objects, to the feature-point extraction selecting portion 54. The feature-point extraction selecting portion 54 extracts the feature points from the frame images. For example, when a new frame image $A_0$ is received at the time $t_0$, the feature points are extracted. Harris operator, SUSAN operator, Foerstner operator, Sojka operator, SIFT, or the like may be used as this feature-point extraction method.

Figure 15:
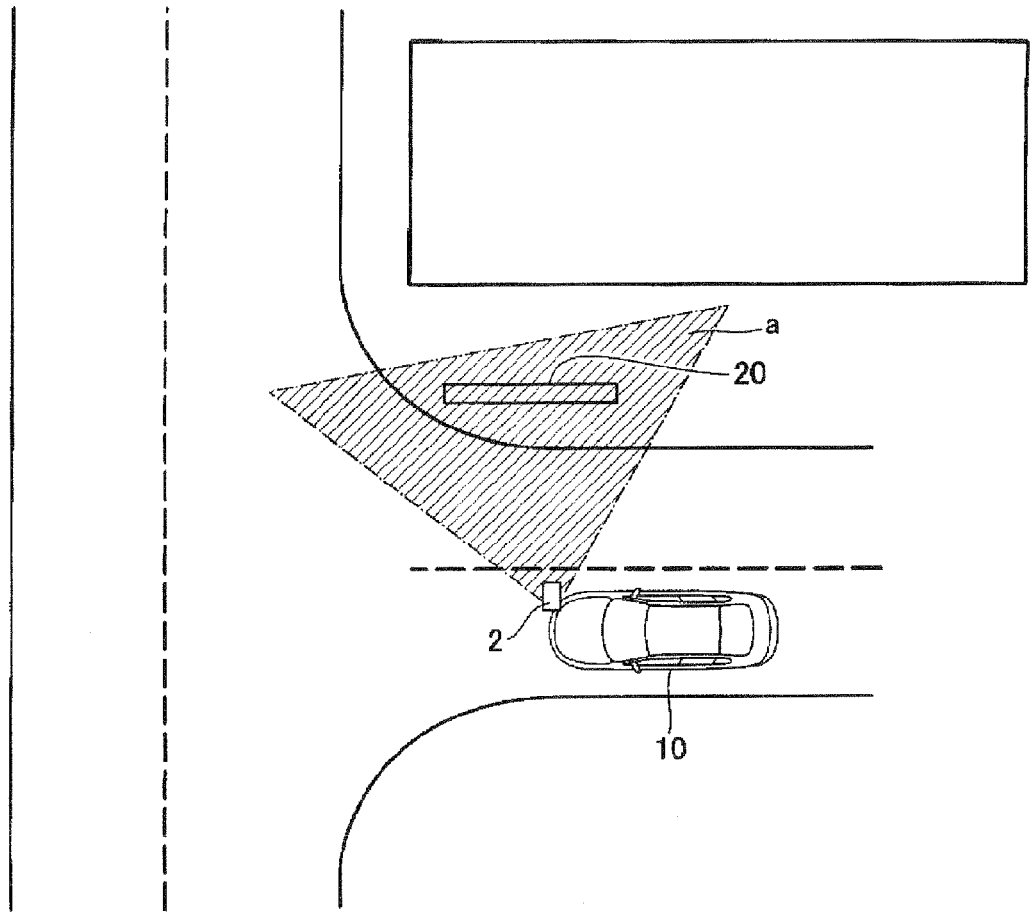
FIG. 15 is an explanatory diagram at a frame-image picking-up time according to the present embodiment.
Figure 16A:
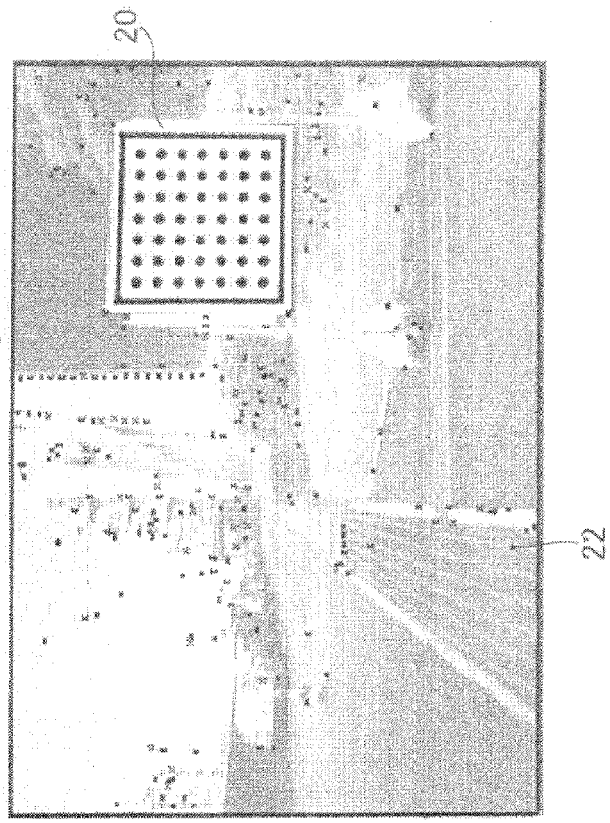
FIGS. 16A and 16B are frame images which are picked up by a camera of FIG. 15.
Figure 16B:
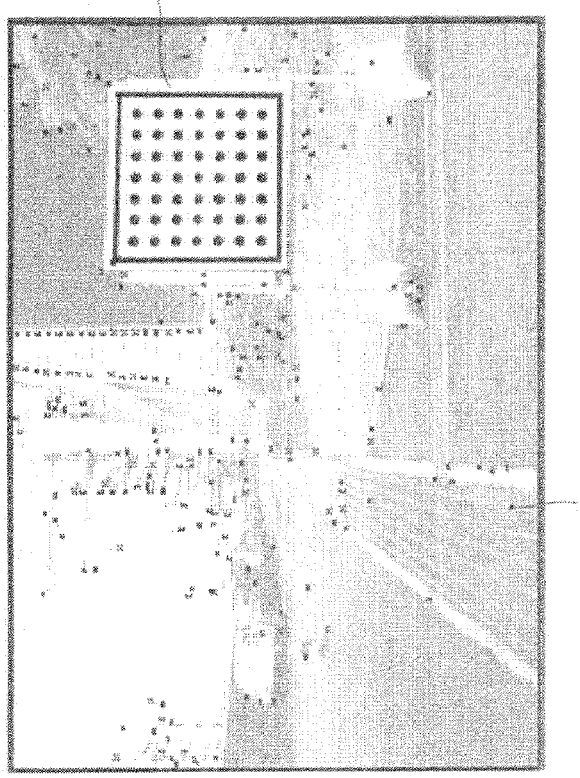

FIG. 15 illustrates a state in which the vehicle 10 turns to the right at an intersection of a T-shaped road. The camera 2 of the vehicle 10 captures a sign 20 in its view fields a. FIGS. 16A and 16B show the respective frame images A1, A2 at the times t1, t2 in the state shown in FIG. 15. The time t2 is the time when the specified time has passed after the time t1. In each of FIGS. 16A and 16B, many feature points 22 are shown as one example. The feature-point extraction selecting portion 54 selects the specified numbers of feature points (the eight points in the present embodiment), which is used for the calculation of the camera's move amount by the camera move calculating portion 34, from the feature points extracted from the frame image $A_{-1}$ which has been received previously by a selecting processing which will be described. Herein, the camera move calculating portion 34 may select the specified numbers of feature points from the frame image $A_0$ in place of the frame image $A_{-1}$. Further, the camera move calculating portion 34 receives, from the search-area setting portion 53, the search-image area setting data for searching the corresponding points in the frame image $A_0$ which correspond to the selected feature points in the frame image $A_{-1}$. The feature-point extraction selecting portion 54 sets the search image area for searching the corresponding points in the frame image $A_0$ which correspond to the selected feature points in the frame image $A_{-1}$ based on the data.

Figure 17:
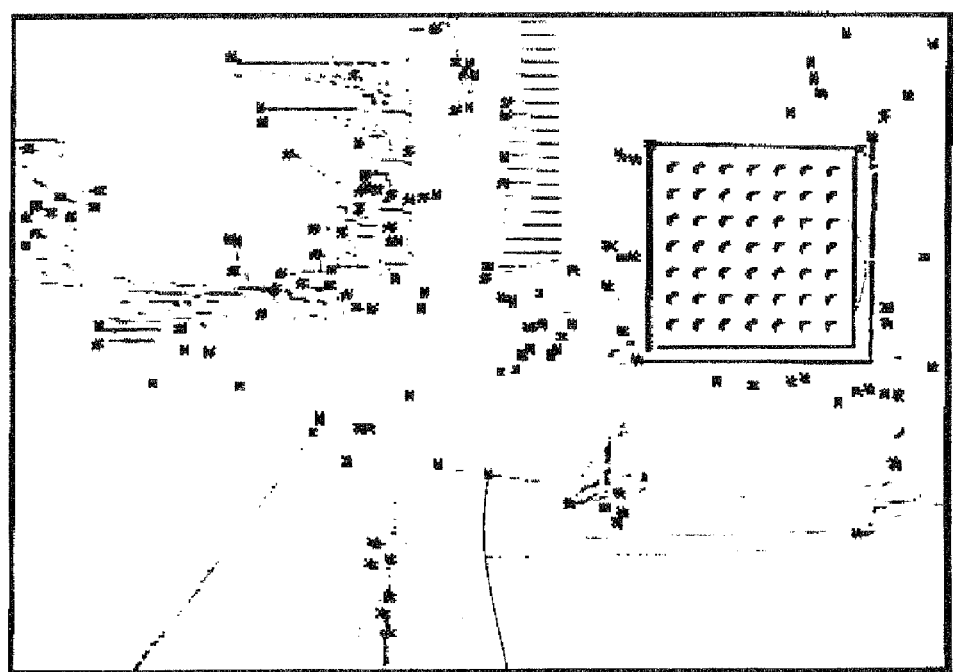
FIG. 17 is an explanatory diagram of corresponding points in the frame image according to the present embodiment.

The feature matching processing portion 33 receives the specified numbers of feature points selected by the feature-point extraction selecting portion 54 and the search image area in the frame image $A_0$ which correspond to these feature points from the feature-point extraction selecting portion 54, and searches the corresponding points of the respective feature points in the corresponding search image areas in the frame image $A_0$ and determines these corresponding points. In this determination processing, the feature matching processing portion 33 extracts an image part (area) which has the highest brightness correlation with the image part (area) of the feature points of the frame image $A_{-1}$ near the feature points in the search image area which have been extracted at the frame image $A_0$ by matching processing. Thus, the matching with the feature points of the frame image $A_{-1}$ is conducted, and thereby the corresponding points in the frame image $A_0$ are determined. These corresponding points may be the feature points which have been extracted at the frame image $A_0$, or the image part near the feature points. Other brightness inclination correlation, phase limitation correlation, feature amount correlation, SIFT's correlation or the like may be used as the method of this feature matching. As an example, FIG. 17 shows all corresponding points 23 which can be matched with the feature points 22 of the frame image A1 in the frame A2.

In the present embodiment the feature-point extraction selecting portion 54 has extracted the feature points of the frame image $A_0$ previously. Accordingly, the corresponding points of the frame image $A_0$ which correspond to the feature points of the frame image $A_{-1}$ may be selected from the feature points extracted in the search image area by matching to simplify the processing of the feature matching processing portion 33. Further, while the feature matching processing portion 33 of the present embodiment conduct matching only for the specified numbers of feature points selected by the feature-point extraction selecting portion 54, the matching may be conducted for all of the feature points. In this case, the feature-point extraction selecting portion 54 may select the specified numbers of feature points after the matching for all feature points. Moreover, in case the feature-point extraction selecting portion 54 selects the specified numbers of feature points from the frame image $A_0$, the search-area setting portion 53 outputs the search-image-area setting data for searching the corresponding points in the frame image $A_{-1}$ which correspond to the selected feature points in the frame image $A_0$, and the feature-point extraction selecting portion 54 sets the search image area in the frame image $A_{-1}$. In this case, the feature matching processing portion 33 conducts the above-described matching processing for the frame image $A_{-1}$ and determines the corresponding points.

The camera move calculating portion 34 calculates the move amount of the camera 2 (the move amount of the vehicle 10) by using the frame images at each time it receives the frame images every the specified time. That is, the camera move calculating portion 34 calculates the camera's move amount $P_0$, for example, from the time $t_{-1}$ when it receives the frame $A_{-1}$ as the previous processing object to the time $t_0$ when it receives the frame image $A_0$ as the present processing object. That is, the camera move calculating portion 34 calculates the rotational move element R and the translation (move) element t of the three axes. In the present embodiment the camera move calculating portion 34 calculates the camera's move amount P with the known 8-point algorism. That is, the camera move calculating portion 34 calculates the basic matrix and the fundamental matrix based on the specified numbers (eight) of feature points of the frame image $A_{-1}$ and the corresponding points of the frame image $A_0$, the known internal camera parameter, and so on, and then calculates the rotational move element R and the translation (move) element t by solving the basic matrix with the unique-value resolution method or the like. Herein, the scale may be determined based on the disposition height of the camera 2 which is obtained by detecting the road surface from the frame images, or the distance data from the distance sensor 8 may be used for the scale determination.

Herein, in case the internal camera parameter is known, the camera move calculating portion 34 may calculate the basic matrix from the seven feature points with the nonlinear solution in place of the above-described calculating manner using the linear solution for the eight feature points. Further, in case the internal camera parameter is unknown, the camera move calculating portion 34 may calculate the basic matrix from the fundamental matrix obtained from the eight feature points with the nonlinear solution. Moreover, in case the internal camera parameter is known, the camera move calculating portion 34 may calculate the basic matrix directly from the five feature points with the nonlinear solution.

The three-dimension coordinates-value calculating portion 37 estimates the three-dimension coordinates values of the feature points in the frame images with the stereo processing based on the three-angle measuring by using the obtained camera's move amount P and the corresponding feature points. This method is known, so the detailed descriptions are omitted. The three-dimension data accumulating portion 59 saves the three-dimension data calculated by the three-dimension coordinates-value calculating portion 37. The camera move estimating portion 58 predicts the camera's move amount $P_{+1}$ which is to be calculated by the camera move calculating portion 34 at the receipt of the frame image $A_{+1}$ at the next processing timing (time $t_{+1}$). This prediction is conducted at the processing timing of the time $t_0$ based on the camera's move amounts which the camera move calculating portion 34 has calculated. According to the present embodiment, the camera move estimating portion 58 calculates a camera's move amount $P_{+1}'$ which is a prediction value of the camera's move amount $P_{+1}$ at the next processing based on a change of the camera's move amounts by using Kalman filter. Herein, the camera move estimating portion 58 may calculate the current camera's move amount from the measurement data of the position measuring sensor 5, the onboard sensor 6, the distance sensor 8, and so on. Further, the estimation accuracy of the camera's move estimation amount which is calculated with the image processing may be improved by correction with the camera's move amount which is calculated based on the measurement data.

The search-area setting portion 53 calculates the search-image area setting data for identifying the search-image area which is to be predicted based on the predicted camera's move amount $P_{+1}'$, considering the three-dimension data. Herein, the search-image area which is to be predicted means the area in which the feature point in the frame image $A_0$ at the time $t_0$ when the camera move estimating portion 58 calculates the camera's move amount $P_{+1}'$ move in the frame image $A_{+1}$ at the time $t_{+1}$. This search-image area is set in a specified range, for example, within tens of picture elements, with its center located at the position of the feature point of the previous-processing's frame image $A_0$ which is predicted in the current-processing's frame image $A_{+1}$. Thus, according to the present embodiment, the camera's move amount is previously predicted, the search-image area is set based on the image area which is to be predicted according to the move of the feature points, and then the corresponding points which correspond to the feature points are extracted within this search-image area. Accordingly, the calculation processing can be reduced greatly. Further, the search range is limited to the search-image area, so the accurate matching (correspondence) can be provided. Moreover, according to the present embodiment, the camera move calculating portion 34 does not calculate the camera's move amount from many camera's move amounts which have been calculated from many possible combinations of eight-point feature points like the conventional manner, but calculate the camera's move amount P by using the proper eight-point feature points and the corresponding points which correspond to the feature points accurately. Accordingly, the calculation load of the camera's move amount P can be reduced properly.

Figure 18A:
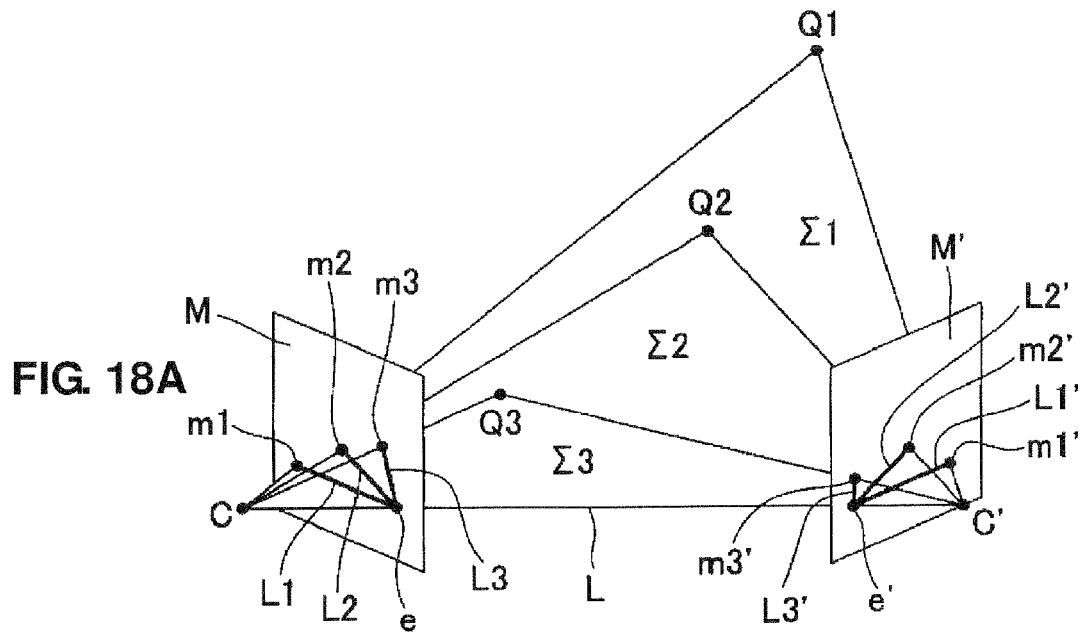
FIGS. 18A and 18B are explanatory diagrams showing relationships of feature points, epipolar planes and epipolar lines according to the present embodiment.

Hereinafter, the above-described selection processing of the feature points will be described. FIG. 18A shows a case in which the camera 2 moves from the time t1 to the time t2. Herein, the optical center of the camera moves from a point C to a point C'. For example, points Q1, Q2, Q3 in the space, which are the feature points, are respectively recognized as image coordinates values m1, m2, m3 in an image plane M of the optical-center point C, while they are respectively recognized as image coordinates values m1', m2', m3' in an image plane M' of the optical-center point C'. The epipolar plane E1 is defined by the optical-center points C, C' and the point Q1, the epipolar plane E2 is defined by the optical-center points C, C' and the point Q2, and epipolar plane E1 is defined by the optical-center points C, C' and the point Q3. The epipolar lines L1, L2, L3 which respectively intersect the epipolar planes Σ1, Σ2, Σ3 on the image plane M, and the epipolar lines L1', L2', L3' which respectively intersect the epipolar planes Σ1, Σ2, Σ3 on the image plane M'. Further, intersections of a straight line L which connects the optical-center points C, C' and the two image planes are defined as epipoles e, e'.

Figure 18B:
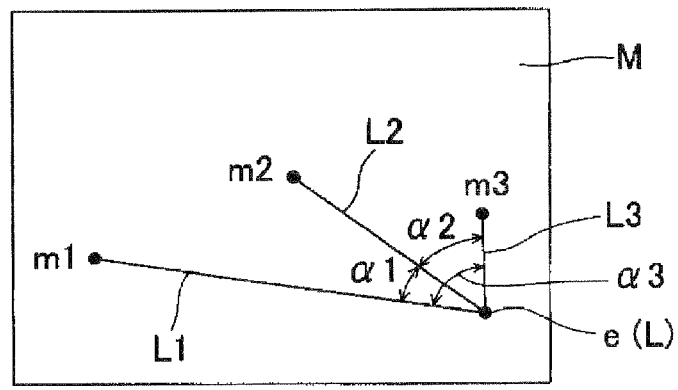

FIG. 18B is the image plane M when viewed from the optical-center point C. As apparent from this figure, the epipolar lines L1, L2 (or the epipolar planes Σ1, Σ2) intersect each other on the image plane M around the straight line L (i.e., the straight line connecting the epipoles e, e') with an angle α1, the epipolar lines L2, L3 (or the epipolar planes Σ2, Σ3) intersect each other with an angle α2, and the epipolar lines L1, L3 (or the epipolar planes Σ1, Σ3) intersect each other with an angle α3. Herein, the angle α3 is the greatest.

Herein, if the two space points are disposed so as to spread at least in the perspective direction in the three-dimension space, the angle between the epipolar planes may become greater. If the angle between the epipolar planes is great, the epipolar restraint may be stronger. Further, if the space points are disposed so as to disperse uniformly in the perspective direction, the epipolar lines may be distributed around the epipole e at regular angle-intervals. Therefore, it may be preferable that the space points be selected such that the angle α3 is a specified angle or greater and the angle α1 is almost equal to the angle α2. Accordingly, in case the camera's move amount P is calculated buy using the above-described eight-point algorism, if the feature points of the eight points selected between the two frame images are distributed so as to spread widely in the three-dimension space, the more accurate calculation of the fundamental matrix and the like can be provided without receiving any influence of error. Accordingly, it is preferable that the eight-point feature points be selected such that the selected eight points spread widely in the space, the epipolar lines are distributed around the epipole at regular angle-intervals, and the maximum angle between the epipole lines is the specified angle or greater. Thereby, the accuracy of calculation of the camera's move amount can be improved compared to the conventional manner in which the eight points are selected at random.

Figure 19:
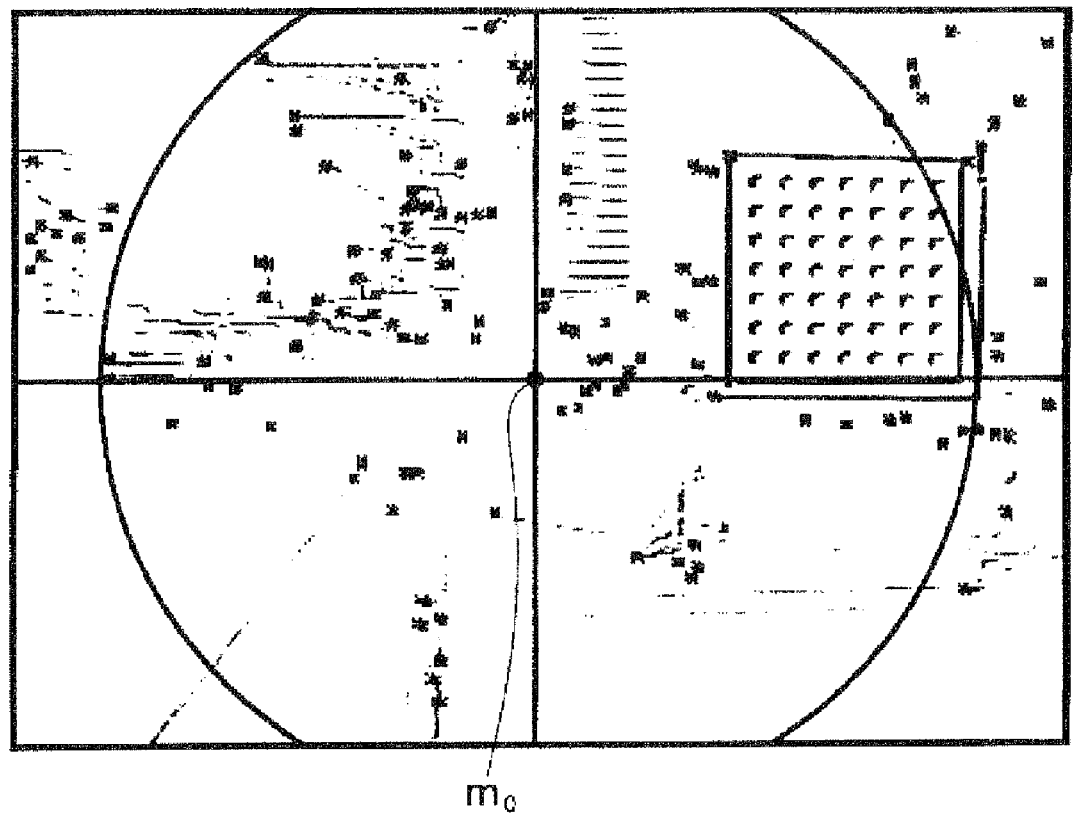
FIG. 19 is an explanatory diagram of selection processing of the feature points according to the present embodiment.

However, the angle between the epipolar planes may not be calculated unless the corresponding points to the feature points are determined accurately and thereby the basic matrix is obtained. Therefore, the angle between the epipolar planes is not known before the determination of the corresponding points. Meanwhile, the angle between the epipolar planes is related to the distance between the object to be picked up and the camera 2. The case in which this angle becomes great is only for the epipolar plane which is formed by a point of the object near the camera 2 or the epipolar plane which is formed by a point of the object far from the camera 2. According to the present embodiment, the camera 2 is disposed with its optical axis extending substantially horizontally so that the frame image picked up thereby can be captured by the driver's eyes. Thereby, as shown in FIGS. 16A and 16B, roads are recognized at a lower area of the frame image, buildings and the sky are recognized at its upper area, and the horizon is positioned at its central area. Accordingly, the space points near the camera 2 are picked up at the lower side of the frame image, and the space points far from the camera 2 are picked up at the upper side of the frame image. Therefore, according to the present embodiment, the feature-point extraction selecting portion 54 selects the specified numbers of points from the feature points which are the furthest from the image-plane center $m_0$ in order to get the wide spreading as described above. FIG. 19 shows this processing schematically, and the distance from the image-plane center $m_0$ to the future points is calculated, and the specified numbers of points are selected from the feature points which have the greatest distance. Thereby, the feature points which are located at the position closest to the camera 2 and at the position furthest from the camera 2 in the three-dimension space and have the great angle between the epipolar lines can be selected. The camera move calculating portion 34 of the present embodiment calculates the fundamental matrix by using the specified numbers of future points and corresponding points which are selected this manner.

Herein, the following modification may be applied. In a modified example, the camera move calculating portion 34 obtains a temporary fundamental matrix first by using the selected specified numbers of future points and corresponding points, calculates the difference from epipolar restraint conditions for the feature points and the corresponding points, and then adopt the obtained fundamental matrix in case the difference is smaller than a specified threshold. In case the difference is greater than the threshold, the camera move calculating portion 34 excepts the feature points which are the furthest from the image-plane center from the selection, and obtains the feature points which are the second furthest from the image-plane center and obtains a temporary fundamental matrix again by using the obtained feature points. This processing is repeated. Thereby, the specified numbers of feature points which have the difference from the epipolar restraint conditions which becomes smaller than the threshold can be determined. Further, the feature points and the corresponding points which meet the epipolar restraint conditions of the temporary fundamental matrix which has the difference smaller than the threshold may be extracted, and the fundamental matrix may be determined by the linear solution or the nonlinear solution.

Moreover, the specified numbers of feature points may be selected by the following other methods.

In a processing method according to a first modified example of the present embodiment, the feature-point extraction selecting portion 54 selects the combination of the feature points which has the largest area of a polygon which is formed by the lines connecting the specified numbers of future points. In this case, the camera move calculating portion 34 may obtain the fundamental matrix by using the selected specified numbers of feature points and the corresponding points. Further, the camera move calculating portion 34 may obtain the above-described fundamental matrix which is obtained by using the selected specified numbers of feature points and the corresponding points as a temporary one, and in case the difference from the epipolar restraint conditions is a specified threshold or smaller, the camera move calculating portion 34 may adopt this temporary fundamental matrix. In case the difference is greater than the specified threshold, the camera move calculating portion 34 obtains the combination of the future points which has the second largest area. By repeating these processing, the specified numbers of feature points which have the difference from the epipolar restraint conditions which is the specified threshold or smaller can be determined.

Figure 20B:
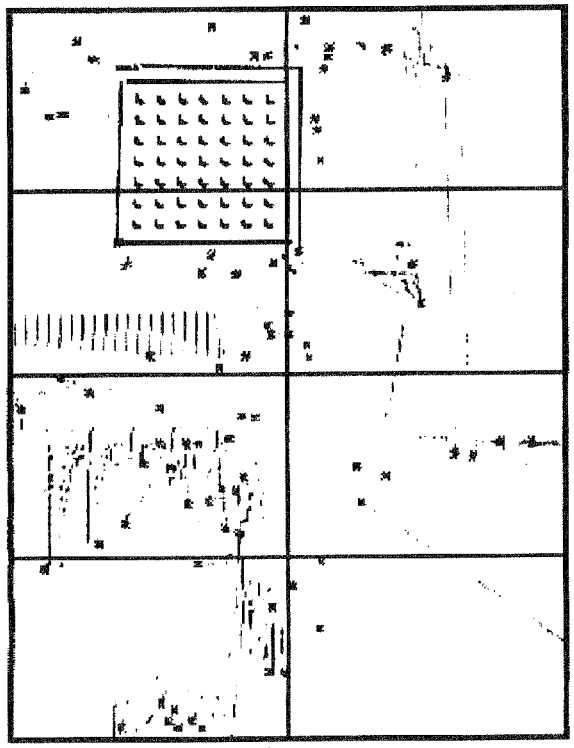
FIGS. 20A and 20B are explanatory diagrams of the selection processing of the features according to a modified example of the present embodiment.
Figure 20A:
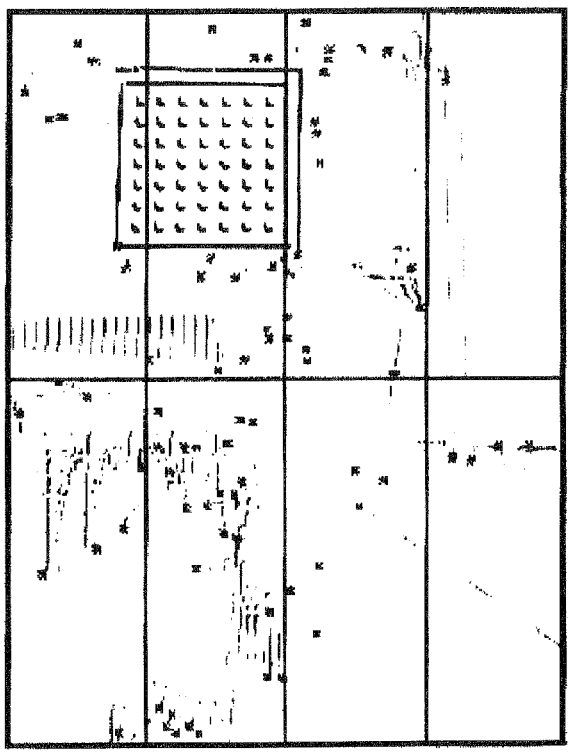

In a processing method according to a second modified example of the present embodiment, the feature-point extraction selecting portion 54 selects one point from each of split image areas at random as shown in FIGS. 20A and 20B. Herein, the split image areas are formed by splitting the image plane into the specified numbers of areas (eight image areas in this example). In this case, the camera move calculating portion 34 may obtain the fundamental matrix by using the selected specified numbers of feature points and the corresponding points. Further, the camera move calculating portion 34 may obtain the above-described fundamental matrix which is obtained by using the selected specified numbers of feature points and the corresponding points as a temporary one, and in case the difference from the epipolar restraint conditions is a specified threshold or smaller, the camera move calculating portion 34 may adopt this temporary fundamental matrix. In case the difference is greater than the specified threshold, the camera move calculating portion 34 obtains the combination of the future points which are further selected at random from the split area. By repeating these processing, the specified numbers of feature points which have the difference from the epipolar restraint conditions which is the specified threshold or smaller can be determined. Herein, it is preferable that a horizontal split lines passing through the center of the image plane as shown in FIGS. 20A and 20B be contained. Thereby, the selection of the future points which disperse in the perspective direction can be obtained.

In a processing method according to a third modified example of the present embodiment, the feature-point extraction selecting portion 54 temporarily calculates optical flow vectors which are formed by the feature points of the frame image $A_0$ which is a processing object at the current time and the frame image $A_{-1}$, which is obtained previously, and then selects half the specified numbers of the optical flow vectors calculated which are relatively large and the rest of half the specified numbers of the optical flow vectors calculated which are relatively small. That is, in case the eight points of feature points are selected, for example, the eight points of feature points which form the four relatively-large optical flow vectors and the four relatively-small optical flow vectors are selected. That is, the optical flow vector of the space point which is close to the camera 2 is relatively large, while the optical flow vector of the space point which is far from the camera 2 is relatively small. Accordingly, the feature points can be dispersed in the perspective direction by selecting the four relatively-large optical flow vectors and the four relatively-small optical flow vectors. In this case, the camera move calculating portion 34 may obtain the fundamental matrix by using the selected specified numbers of feature points and the corresponding points. Further, the camera move calculating portion 34 may obtain the above-described fundamental matrix which is obtained by using the selected specified numbers of feature points and the corresponding points as a temporary one, and in case the difference from the epipolar restraint conditions is a specified threshold or smaller, the camera move calculating portion 34 may adopt this temporary fundamental matrix. In case the difference is greater than the specified threshold, the camera move calculating portion 34 excepts the feature points which form the largest and smallest optical flow vectors, and obtains the feature points which form the second largest optical flow vector and the second smallest optical flow vector, thereby obtains a temporary fundamental matrix again. This processing is repeated. Thereby, the specified numbers of feature points which have the difference from the epipolar restraint conditions which becomes smaller than the threshold can be determined. Herein, the feature points may be selected based on the three-dimension coordinates value which is calculated by the three-dimension coordinates-value calculating portion 37, considering the uniformity and spread of the disposition or the distance of objects in the frame image.

Figure 21:
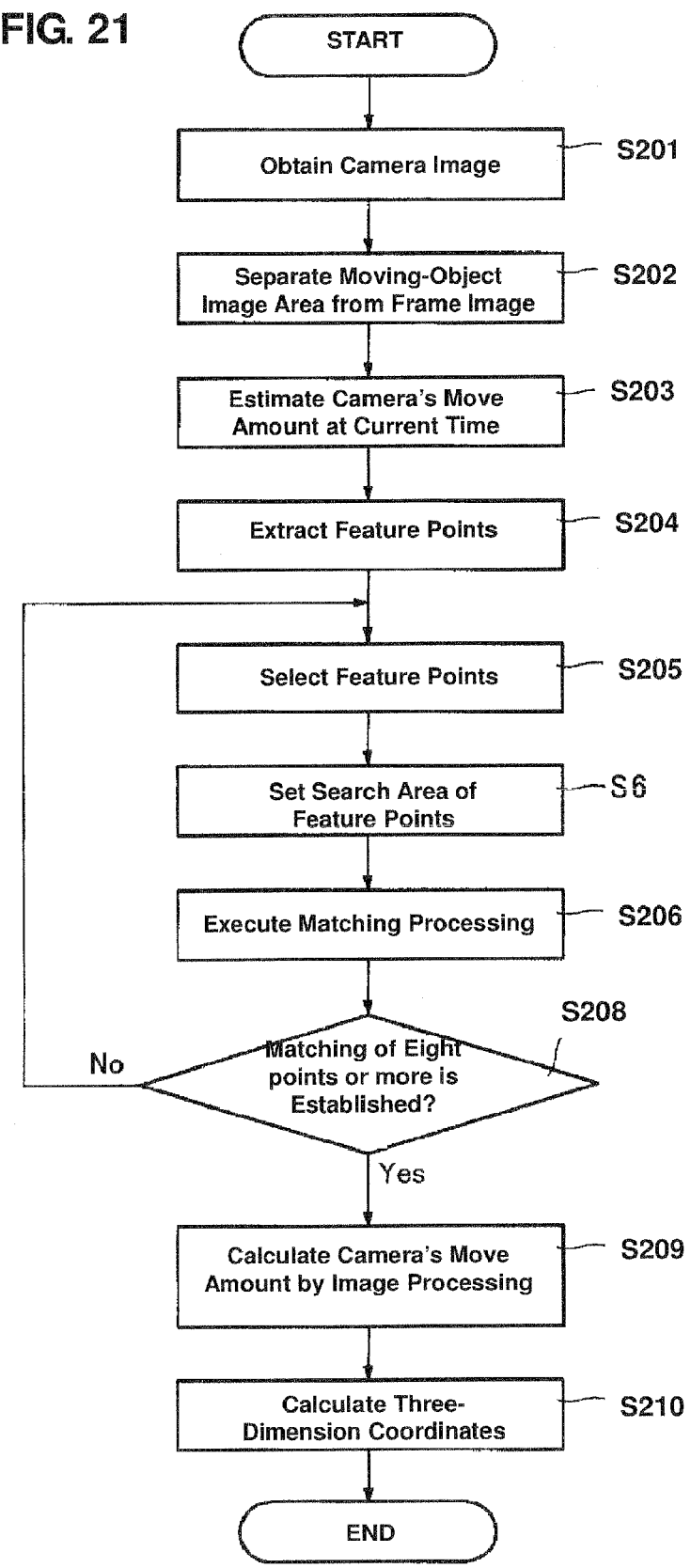
FIG. 21 is a flowchart of processing which is executed by the image processing device for a vehicle according to the present embodiment.

Hereinafter, the processing flow of the controller 3' according to the present embodiment will be described referring to FIG. 21. Duplicated descriptions of the processing relevant to the above-described functional portions are omitted. This processing is executed by the controller 3' repeatedly. First, the image obtaining portion 31 of the controller 3' receives the frame image from the camera 2 (step 201). Then, the moving-object area separating portion 52 separates a moving-object image area from the frame image (step S202). The camera move estimating portion 58 estimates the camera's move amount at the current time from the frame images which have been received, or calculates the camera's move amount based on the measurement data of the position-measuring sensor and so on (step S203). Then, the feature-point extraction selecting portion 54 extracts the feature points from the frame image which is received in the processing at this time (step S204). Further, the feature-point extraction selecting portion 54 selects the specified numbers of feature points from the feature points of the frame image which has been received in the previous processing by the above-described selection processing (step S205). The search-area setting portion 53 calculates the search-image area setting data based on the camera's move amount at the current timing which has been estimated by the camera move estimating portion 58 and the three-dimension data and so on, and outputs to the feature-point extraction selecting portion 54. The feature-point extraction selecting portion 54 sets the search-image area for the frame image received at the current processing timing with respect to the selected each feature point based on the calculated data (step S206). The feature matching processing portion 33 determines the corresponding points which correspond to the selected feature points in the frame image received at the previous processing from the frame image received at the current processing by the matching processing (step S207). In this case, the feature matching processing portion 33 executes the matching processing for the respective feature points in the corresponding search-image areas. The feature-point extraction selecting portion 54 determines whether or not the matching of the selected feature points is established with the specified degree of matching in the search-image areas (step S208). When this matching is not established (No in the step S208), the feature-point extraction selecting portion 54 further selects the feature points additionally and sets the search-image area additionally (step S205). Then, the feature matching processing portion 33 executes the matching processing again (step S207). Thus, the matching of the specified numbers of feature points and the corresponding points between the frame images are conducted by these processing repeated. Meanwhile, when the above-described matching is established (Yes in the step S208), the camera move calculating portion 34 calculates the camera's move amount based on the specified numbers of feature points and the corresponding points which are matched (step S209). Then, the three-dimension coordinates-value calculating portion 37 creates the three-dimension data of the surroundings of the vehicle 10 (step S210).

The present invention should not be limited to the above-descried embodiments, and any other modifications and improvements may be applied within the scope of a sprit of the present invention.

What is claimed is:

1. An image processing device for a vehicle, comprising:
an image picking-up means for picking up an image including an object around the vehicle, the image including a first image and a second image, the timing of the second image picked up being a specified time later than that of the first image picked up;
a basic template creating means for creating a basic template of a picked-up object in the first image;
a transformation matrix calculating means for calculating a transformation matrix to execute an image transformation of an object of the first image to an object of the second image;
a transformation template creating means for creating a transformation template by transforming said basic template with said transformation matrix;
a matching means for executing a template matching processing to the second image with said transformation template to detect the object; and
a determining means for determining that the picked-up object in the second image is identical to said basic template when a matching degree by said matching means is higher than a specified degree.

2. The image processing device for a vehicle of claim 1, further comprising a move-amount calculating means for calculating a move amount of said image picking-up means relative to the object, and a distance calculating means for calculating a distance between the object and the image picking-up means, wherein said transformation matrix calculating means calculates the transformation matrix in a manner of an analogous transformation matrix, affine transformation matrix, or projective transformation matrix in accordance with said move amount which is calculated by the move-amount calculating means and said distance which is calculated by the distance calculating means at the time the second image is picked up.

3. The image processing device for a vehicle of claim 2, wherein said transformation matrix calculating means calculates the transformation matrix in a manner of the projective transformation matrix when said move amount is greater than a specified amount and said distance is a specified distance or smaller.

4. The image processing device for a vehicle of claim 3, wherein said transformation matrix calculating means calculates the transformation matrix in a manner of the affine transformation matrix when the move amount is the specified amount or smaller and the distance is the specified distance or smaller, or when the move amount is greater than the specified amount and the distance is greater than the specified distance.

5. The image processing device for a vehicle of claim 3, wherein said transformation matrix calculating means calculates the transformation matrix in a manner of the analogous transformation matrix when the move amount is the specified amount or smaller and the distance is greater than the specified distance.

6. The image processing device for a vehicle of claim 2, further comprising a move-amount estimating means for estimating the move amount of said image picking-up, and a three-dimension coordinates-value calculating means for calculating a three-dimension coordinates value of vehicle surroundings by using said first and second images picked up, wherein said move-amount calculating means calculates the move amount of the image picking-up means relative to the object by using a feature in the first image, which is extracted from the first image, and a corresponding point in the second image which corresponds to said feature in the first image, which is extracted from the second image, and said extraction of the corresponding point is executed in such a manner that a predicted position of said corresponding point in the second image which is calculated based on the move amount estimated by said move-amount estimating means, a search area in the second image for extracting said corresponding point is determined having a center of the search area which is located at said predicted position calculated, and said corresponding point is extracted from said search area determined.

7. The image processing device for a vehicle of claim 6, further comprising a feature-point selecting means for selecting specified numbers of feature points of said feature, wherein said move-amount calculating means calculates the move amount of the image picking-up means relative to the object by using said specified numbers of feature points of the future and corresponding points which correspond to the feature points, and said feature-point selecting means selects the feature points in such a manner that said numbers of epipolar lines which are determined by the selected feature points have a large angle therebetween.

8. The image processing device for a vehicle of claim 7, wherein said feature-point selecting means selects the feature points in order of a further distance from an image center.

9. The image processing device for a vehicle of claim 7, wherein said feature-point selecting means selects the feature points such that an area which is formed by connecting the feature points has the largest area in an image plane.

10. The image processing device for a vehicle of claim 7, wherein said feature-point selecting means selects the feature points by selecting the feature points one by one from areas which are obtained by being split from an image plane into said specified numbers of the feature points.

11. The image processing device for a vehicle of claim 7, wherein said feature-point selecting means selects the feature points by selecting feature points which form relatively-large optical flow vectors, which are formed by said feature points and corresponding points and have half said specified numbers of feature points, and other feature points which form other relatively-small optical flow vectors, which are formed by said feature points and corresponding points and have half said specified numbers of feature points.

* * * * *